United States Patent [19]
Bishop et al.

[11] Patent Number: 5,809,525
[45] Date of Patent: Sep. 15, 1998

[54] MULTI-LEVEL COMPUTER CACHE SYSTEM PROVIDING PLURAL CACHE CONTROLLERS ASSOCIATED WITH MEMORY ADDRESS RANGES AND HAVING CACHE DIRECTORIES

[75] Inventors: James Wilson Bishop, Endicott, N.Y.; Charles Embrey Carmack, Jr., Rochester, Minn.; Patrick Wayne Gallagher, Apalachin, N.Y.; Stefan Peter Jackowski, Endicott, N.Y.; Gregory Robert Klouda, Endwell, N.Y.; Robert Dwight Siegl, Endicott, N.Y.

[73] Assignee: International Business Machines Corporation, Armonk, N.Y.

[21] Appl. No.: 666,154

[22] Filed: Jun. 19, 1996

Related U.S. Application Data

[63] Continuation-in-part of Ser. No. 123,495, Sep. 17, 1993, abandoned.

[51] Int. Cl.⁶ .................................................. G06F 12/08
[52] U.S. Cl. .......................... 711/122; 711/117; 711/118; 711/123; 711/126
[58] Field of Search .......................... 364/DIG. 1, 243.4, 364/243.41; 711/118, 121, 122, 127, 3, 103, 126

[56] References Cited

U.S. PATENT DOCUMENTS

| | | | |
|---|---|---|---|
| 3,735,360 | 5/1973 | Anderson et al. | 395/250 |
| 3,761,883 | 9/1973 | Alvarez et al. | 340/172.5 |
| 4,044,337 | 8/1977 | Hicks et al. | 395/250 |
| 4,084,231 | 4/1978 | Capozzi et al. | 395/425 |
| 4,096,567 | 6/1978 | Millard et al. | 395/600 |
| 4,136,386 | 1/1979 | Annunziata et al. | 364/200 |
| 4,293,910 | 10/1981 | Flusche et al. | 364/200 |
| 4,298,929 | 11/1981 | Capozzi | 395/425 |
| 4,349,871 | 9/1982 | Lary | 364/200 |
| 4,394,731 | 7/1983 | Flusche et al. | 395/425 |
| 4,394,733 | 7/1983 | Swenson | 395/425 |
| 4,422,145 | 12/1983 | Sacco et al. | 364/300 |
| 4,442,487 | 4/1984 | Fletcher et al. | 395/425 |
| 4,445,174 | 4/1984 | Fletcher | 711/3 |

(List continued on next page.)

OTHER PUBLICATIONS

IBM Technical Disclosure Bulletin; vol. 31, No. 2, Jul. 1988 Storage Key Cache Proposal.

IBM Technical Disclosure Bulletin, vol. 34, No. 3, Aug. 1991, pp. 256–258.

(F.J. Sparacio, Data Providing with Second Level Cache, Nov. '78, pp. 2468–2469; IBM Technical Disclosure).

(IBM Technical Disclosure; Shared Instruction and/or Data Caches in a Multiprocessing System; May '85, pp. 6844–6846).

*Primary Examiner*—Tod R. Swann
*Assistant Examiner*—Tuan V. Thai
*Attorney, Agent, or Firm*—Whitham, Curtis & Whitham; Arthur J. Samodovitz

[57] ABSTRACT

A hierarchical cache system comprises first and second pluralities of data caches and first and second respective higher level caches. The first higher level cache is coupled to the first plurality of caches and stores data of the first plurality of caches. The second higher level cache is coupled to the second plurality of caches and stores data of the second plurality of caches. First and second storage controllers access first and second respective address ranges from a main memory and the higher level cache subsystems. The first higher level cache responds to a request for data not contained in the first higher level cache by determining which of the address ranges encompasses the requested data and forwarding the request to the storage controller which can access the determined address range. The second higher level cache responds to a request for data not contained in the second higher level cache by determining which of the address ranges encompasses the requested data and forwarding the request to the storage controller which can access the determined address range.

20 Claims, 21 Drawing Sheets

U.S. PATENT DOCUMENTS

| | | | |
|---|---|---|---|
| 4,467,411 | 8/1984 | Fry et al. | 395/250 |
| 4,484,267 | 11/1984 | Fletcher | 395/425 |
| 4,525,780 | 6/1985 | Bratt et al. | 395/425 |
| 4,535,455 | 8/1985 | Peterson | 371/13 |
| 4,564,899 | 1/1986 | Holly et al. | 395/425 |
| 4,589,092 | 5/1986 | Matick | 364/900 |
| 4,633,440 | 12/1986 | Palulski | 395/189.05 |
| 4,703,481 | 10/1987 | Fremont | 371/12 |
| 4,719,568 | 1/1988 | Carrubba et al. | 364/200 |
| 4,755,930 | 7/1988 | Wilson, Jr. et al. | 711/15 |
| 4,774,654 | 9/1988 | Pomerene et al. | 395/425 |
| 4,797,814 | 1/1989 | Brenza | 395/425 |
| 4,891,809 | 1/1990 | Hazawa | 371/3 |
| 4,907,228 | 3/1990 | Bruckert et al. | 371/68.3 |
| 4,912,707 | 3/1990 | Kogge et al. | 371/12 |
| 4,924,466 | 5/1990 | Gregor et al. | 371/12 |
| 4,947,319 | 8/1990 | Bozman | 395/700 |
| 4,977,498 | 12/1990 | Rastegar et al. | 364/200 |
| 5,023,776 | 6/1991 | Gregor | 711/122 |
| 5,025,366 | 6/1991 | Baror | 395/425 |
| 5,113,514 | 5/1992 | Albonesi et al. | 395/425 |
| 5,136,700 | 8/1992 | Thacker | 711/122 |
| 5,153,881 | 10/1992 | Bruckert et al. | 371/11.3 |
| 5,155,832 | 10/1992 | Hunt | 395/425 |
| 5,241,641 | 8/1993 | Iwasa et al. | 711/122 |
| 5,276,848 | 1/1994 | Gallagher et al. | 711/121 |
| 5,553,263 | 9/1996 | Kalish et al. | 711/127 |
| 5,577,227 | 11/1996 | Finnell et al. | 711/122 |

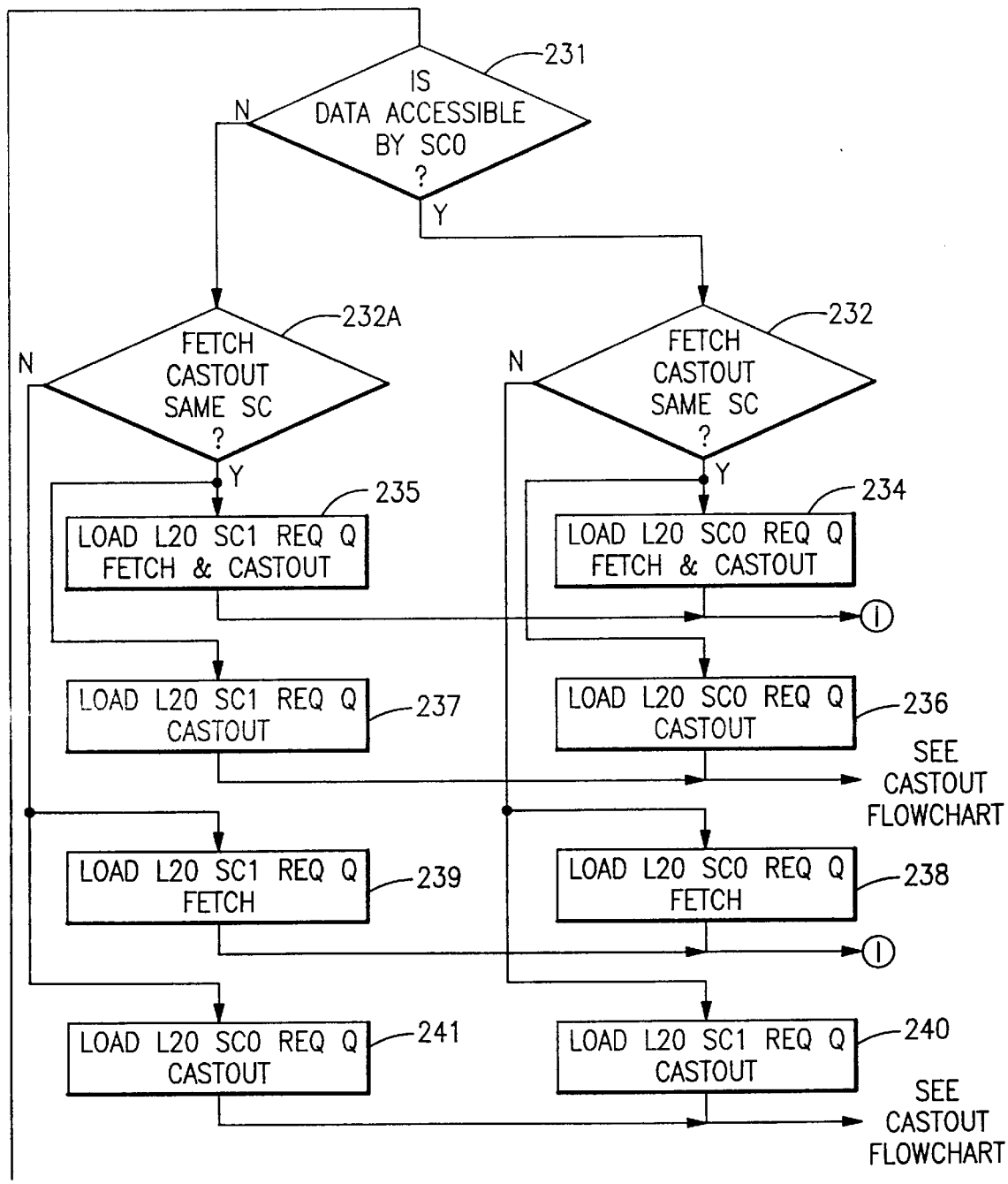
FIG.3(A)A

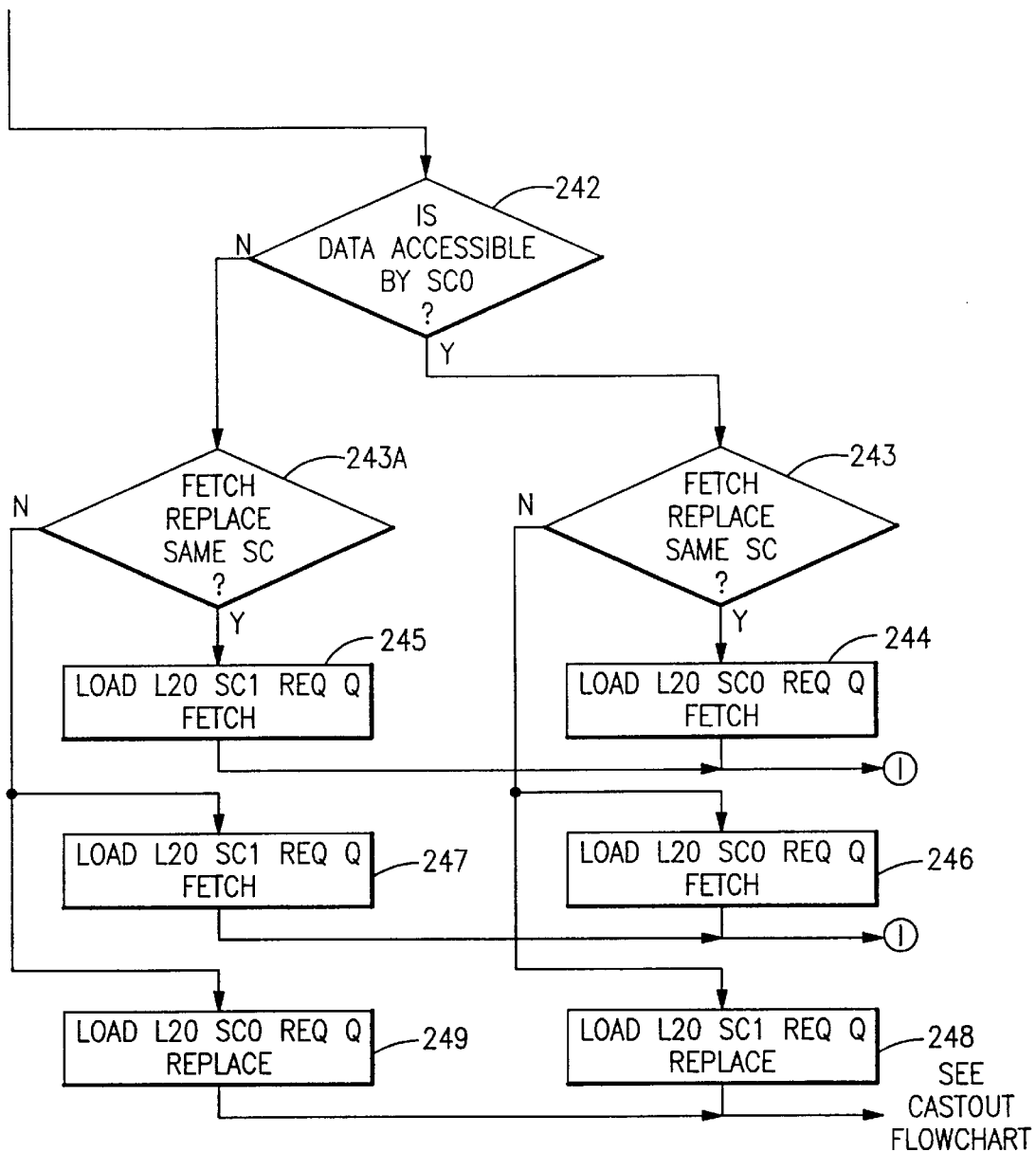
FIG.3(A)B

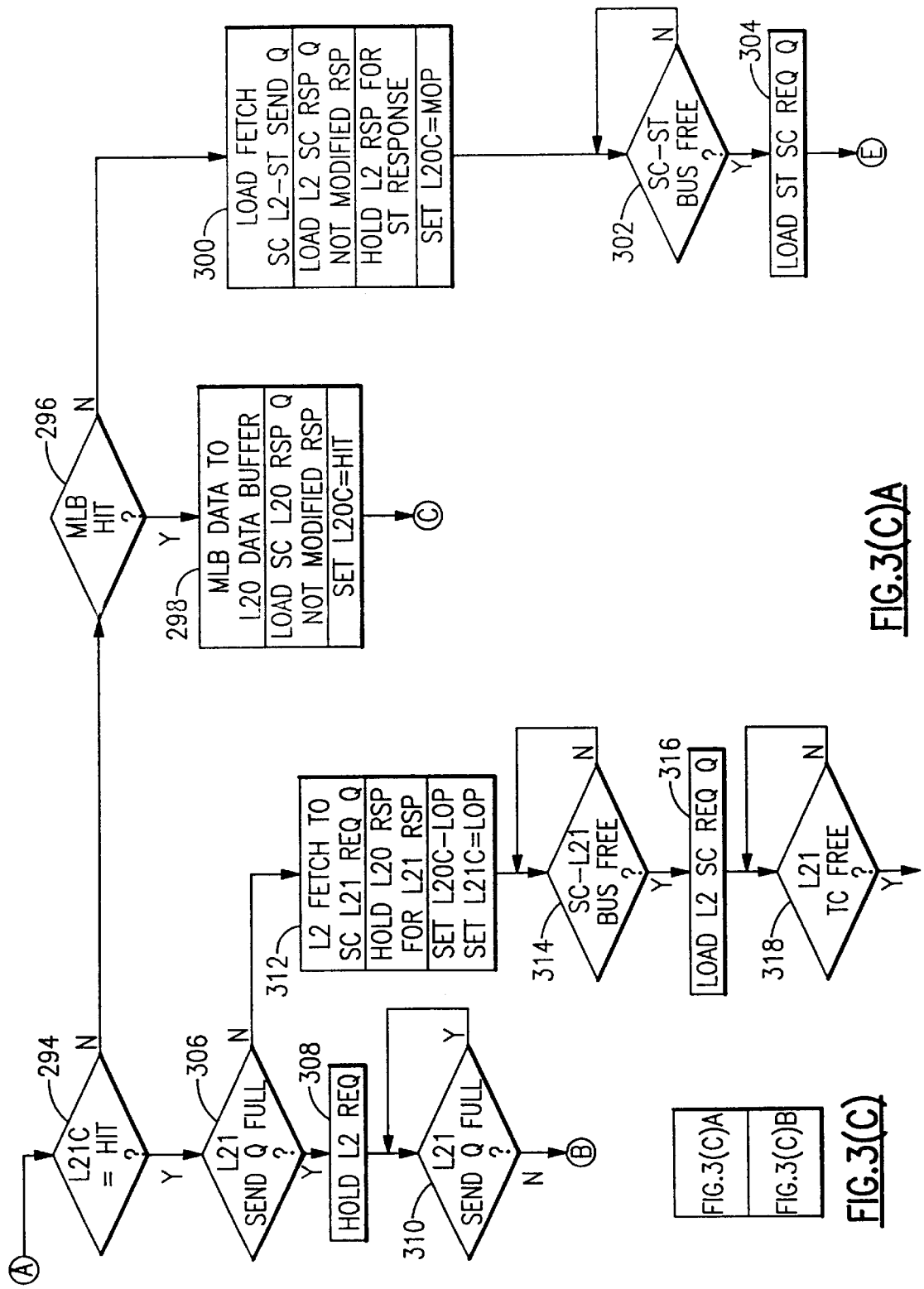
FIG.3(C)A

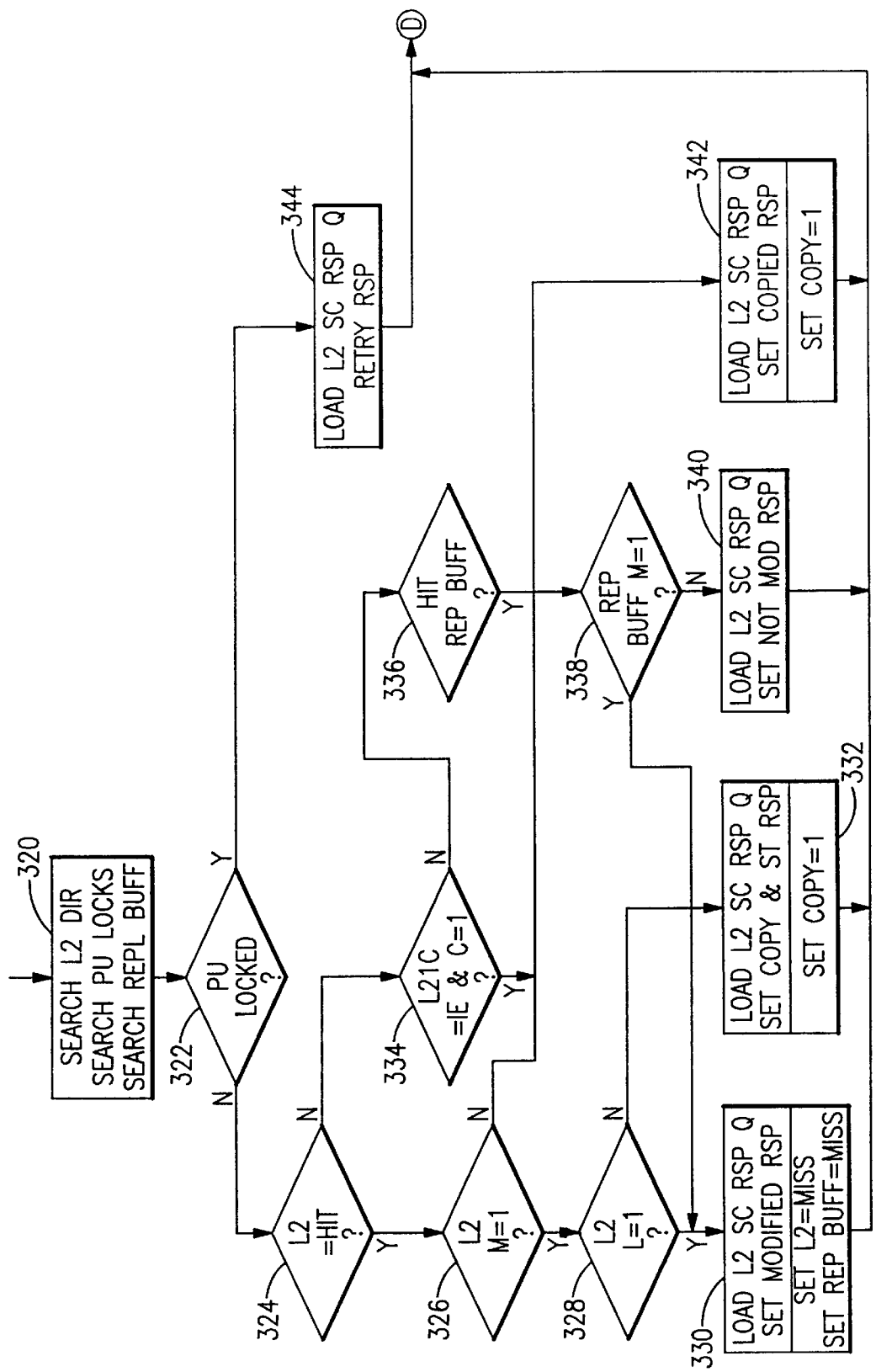
FIG.3(C)B

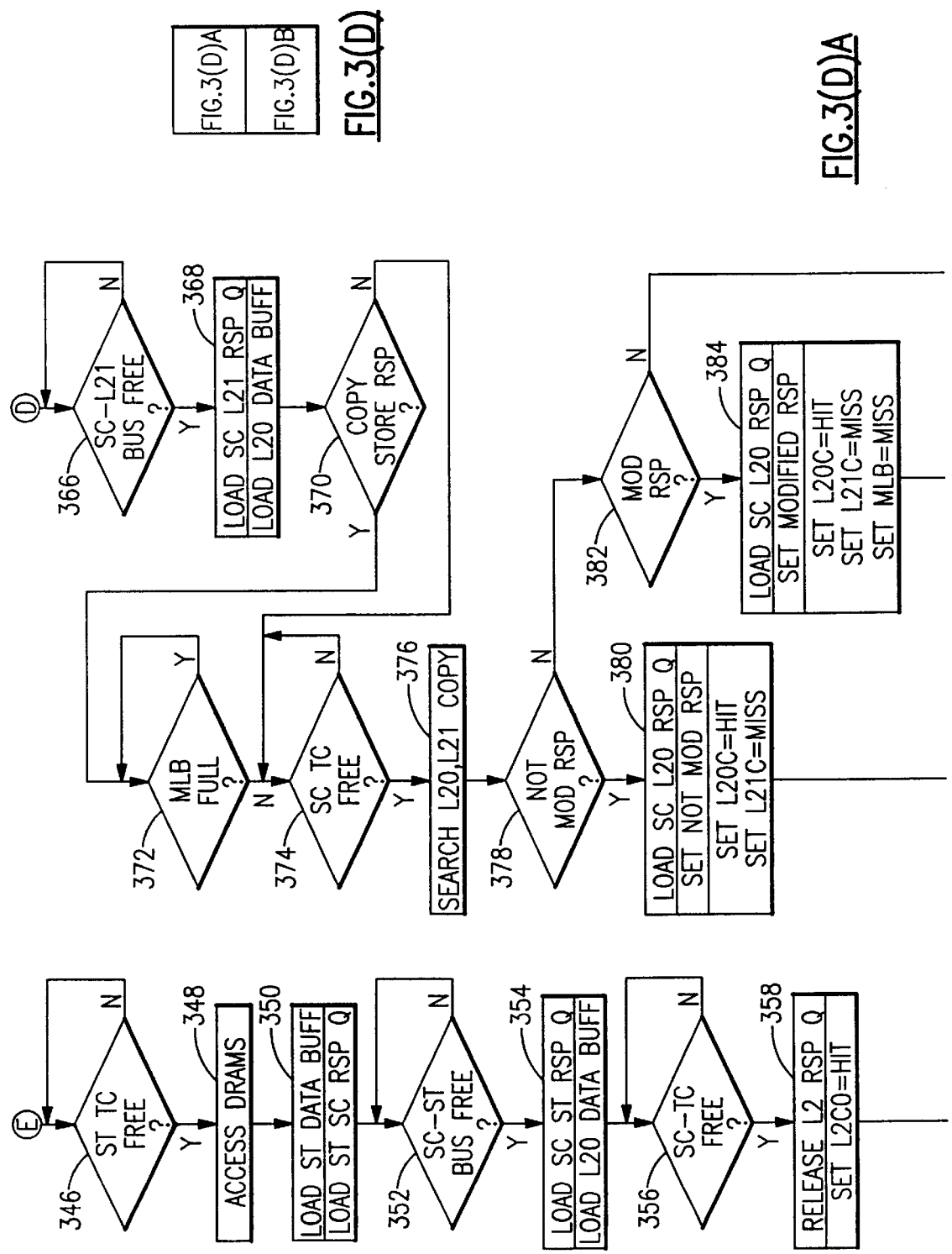

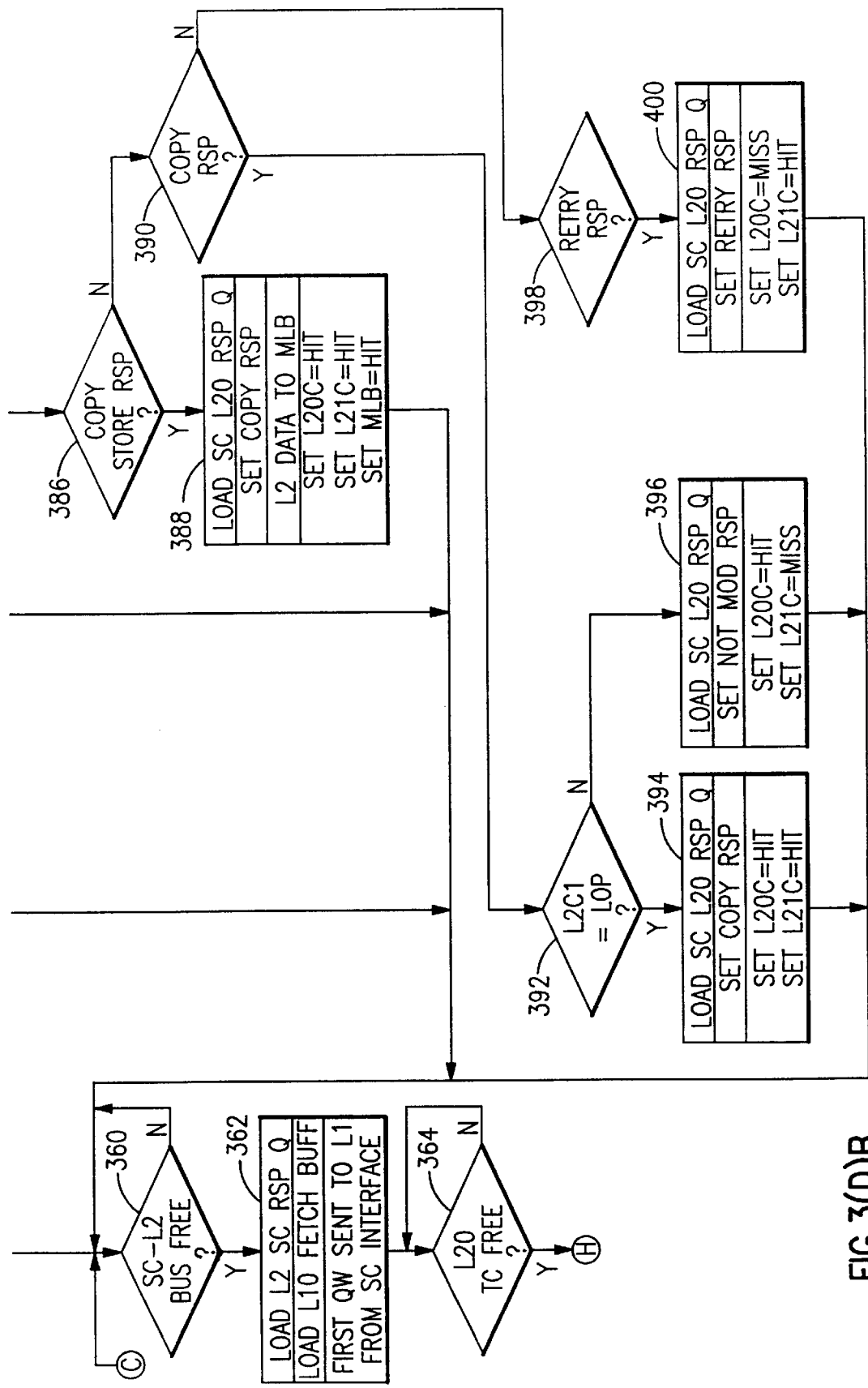
FIG.3(D)B

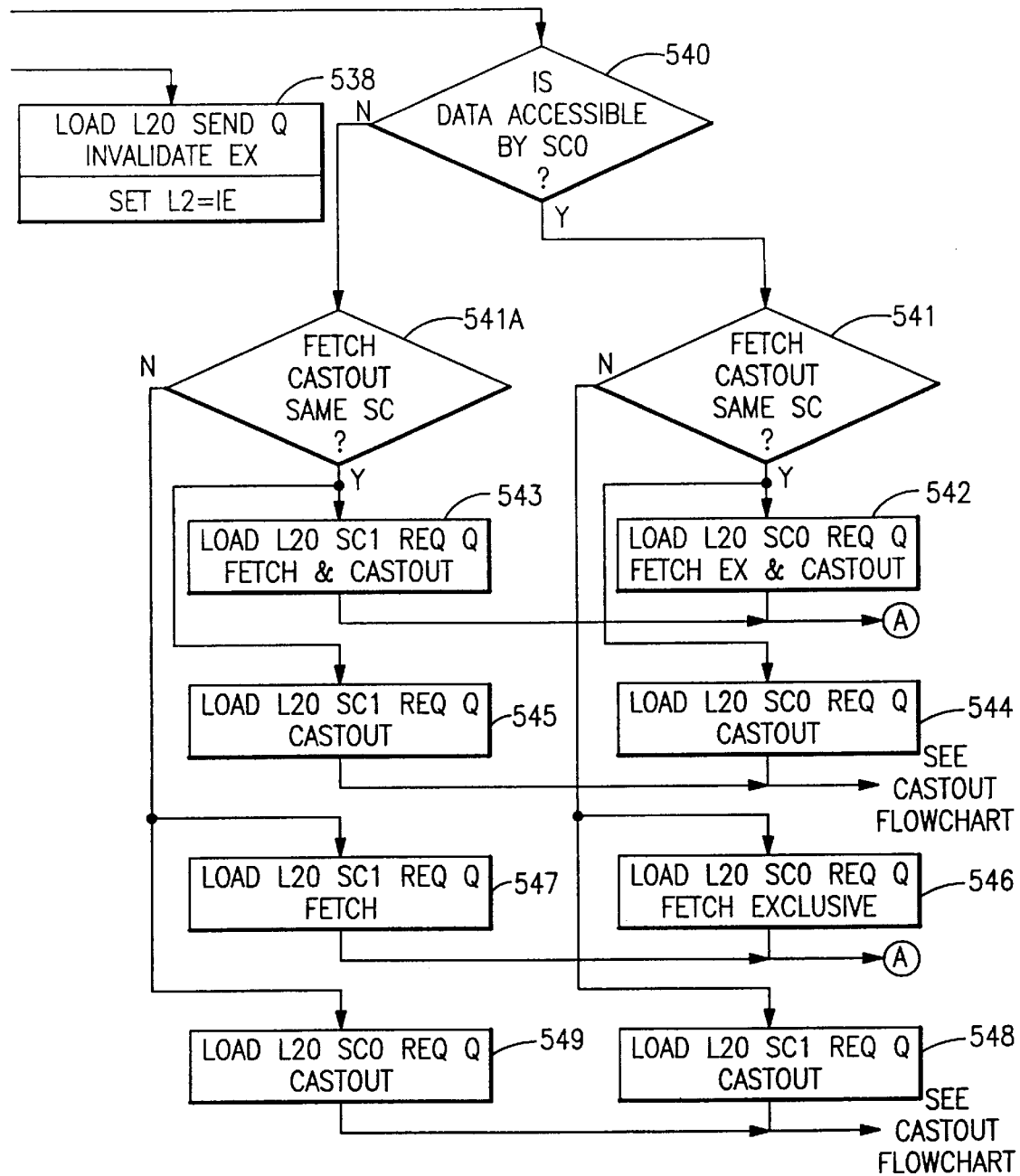
FIG.4(A)A

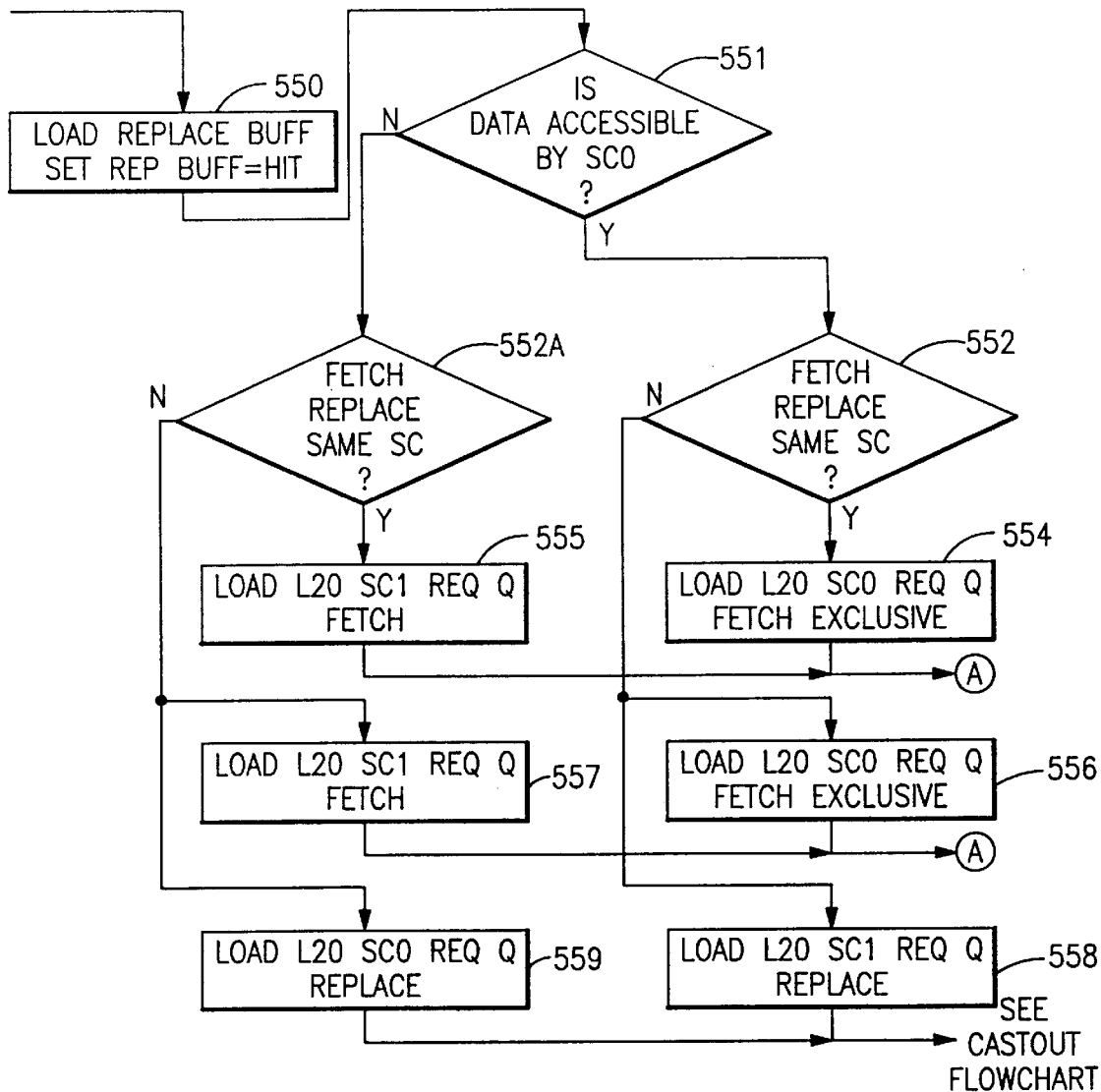
FIG.4(A)B

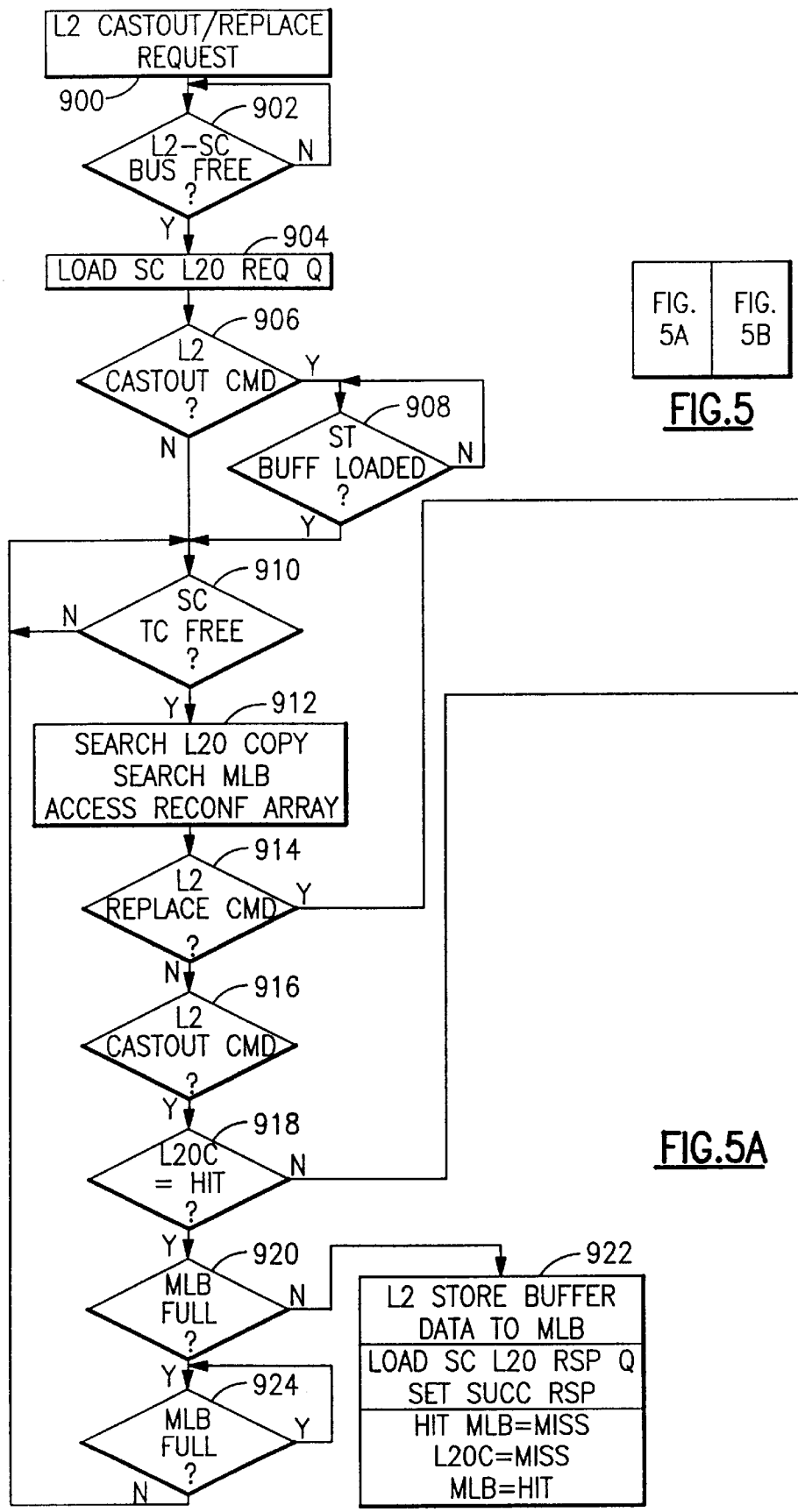

MULTI-LEVEL COMPUTER CACHE SYSTEM PROVIDING PLURAL CACHE CONTROLLERS ASSOCIATED WITH MEMORY ADDRESS RANGES AND HAVING CACHE DIRECTORIES

BACKGROUND OF THE INVENTION

This application is a continuation-in-part of U.S. patent application entitled, "Computer Cache System", Ser. No. 08/123,495, filed by Bishop et al on Sep. 17, 1993 now abandoned.

The invention relates generally to computer systems, and deals more particularly with a hierarchical cache system used by a computer processor.

Previously known computer systems include a CPU, a main memory and a cache system interposed between the main memory and the CPU to expedite access to main memory data. A typical cache system comprises a data cache to store data fetched from or written to main memory, and a directory to store main memory addresses of the data copied into the data cache. The processor can access the data cache faster than the main memory because the data cache is smaller than the main memory, physically located closer to the processor than the main memory, and usually formed from faster but more expensive technology. Consequently, it is desirable to store in the cache the data that is currently needed by the CPU and likely to be needed next. An effective caching strategy relies on spatial and temporal locality of reference, i.e. the data likely to be needed next by the processor is stored in the main memory near the data currently requested. This is true, for example, when the processor requests to sequentially read lines of a file, and the lines of the file are stored in successive locations in main memory. Therefore, when the processor requests data, typically four or eight bytes per request, this data along with the remainder of the cache block (typically several lines comprising 64, 128 or 256 bytes of contiguous address) are fetched from main memory and loaded into the data cache. The time cost of fetching the entire block from the relatively remote main memory is recovered when the processor accesses the remainder of the block from the cache.

A hierarchical two level cache system is also known and includes a plurality of level one (L1) data caches and respective directories. Each pair of L1 cache and directory serves one processor. A level two (L2) data cache and associated directory are coupled to and serve all the L1 caches and associated directories. The L2 data cache is also coupled to the main memory, either directly or through a level three (L3) cache, and stores a copy of all data requested by any of the processors. If another CPU requests the same data, then it is available from the L2 cache and need not be fetched from main memory (which is time consuming). When any processor modifies data, the modified data is written to the L2 cache and control hardware associated with the L2 data cache notifies all other L1 caches that their copy of the data, if stored, is now invalid. Thus, the L2 cache serves as a central station for transferring data between the main memory and the L1 caches.

In some of the prior art two level cache systems, there is a single bus for the L2 data cache, and all the L1 caches share the bus. Thus, the L1 caches experience delays in accessing the L2 data cache when another L1 cache currently masters the bus.

In another prior art two level cache system, there are multiple sets of I/O ports for the L2 data cache, and each L1 data cache has a dedicated set of I/O ports and respective bus. Thus, in this system, the L1 data caches can access the L2 data cache independently of the other L1 data caches. While this latter two level cache system provides faster access to the L2 data cache by the L1 data caches, the L2 data cache is limited in the total number of I/O ports and pins that are available for the L1 data caches. Thus, the number of L1 caches that can be coupled to a single L2 cache is limited. For example, the L2 data cache may have thirty two I/O ports available for all the L1 data caches, and each L1 data cache may require eight I/O ports. In this case, a maximum of four L1 caches can be coupled to the L2 cache. However, some computer systems may require more than four processors and respective L1 caches.

Accordingly, a general object of the present invention is to provide a two or more level cache system for a large number of processors having L1 data caches and still provide fast access by the L1 caches to the L2 level.

Another general object of the present invention is to provide a two or more level cache system of the foregoing type which ensures data consistency throughout the L1 level.

Another general object of the present invention is to provide a two or more level cache system of the foregoing type which minimizes fetches from main memory.

SUMMARY OF THE INVENTION

The invention resides in a hierarchical cache system comprising first and second pluralities of data caches and first and second respective higher level caches. The first higher level cache is coupled to the first plurality of caches and stores data of the first plurality of caches. The second higher level cache is coupled to the second plurality of caches and stores data of the second plurality of caches. First and second storage controllers access first and second respective address ranges from a main memory and the higher level cache subsystems. The first higher level cache responds to a request for data not contained in the first higher level cache by determining which of the address ranges encompasses the requested data and forwarding the request to the storage controller which can access the determined address range. The second higher level cache responds to a request for data not contained in the second higher level cache by determining which of the address ranges encompasses the requested data and forwarding the request to the storage controller which can access the determined address range.

According to one feature of the present invention, the first storage controller includes first and second directories of addresses in the first address range which are represented in the first and second higher level caches, respectively. The second storage controller includes third and fourth directories of addresses in the second address range which are represented in the first and second higher level cache. The first storage controller responds to a request for data from the first higher level cache subsystem by checking the address of the data in the second directory, and passing the request to the second higher level cache subsystem if the requested data is stored there and otherwise passing the request to the first range of main memory. The first storage controller responds to a request for data from the second higher level cache subsystem by checking the address of the data in the first directory, and passing the request to the first higher level cache subsystem if the requested data is stored there and otherwise passing the request to the first range of main memory. The second storage controller responds to a request for data from the first higher level cache subsystem by checking the address of the data in the fourth directory, and passing the request to the second higher level cache subsystem if the requested data is stored there and otherwise passing the request to the second range of main memory. The second storage controller responds to a request for data from the second higher level cache subsystem by checking the address of the data in the third directory, and passing the request to the first higher level cache subsystem if the requested data is stored there and otherwise passing the request to the second range of main memory.

DETAILED DESCRIPTION OF THE PREFERRED EMBODIMENTS

Figure 1:
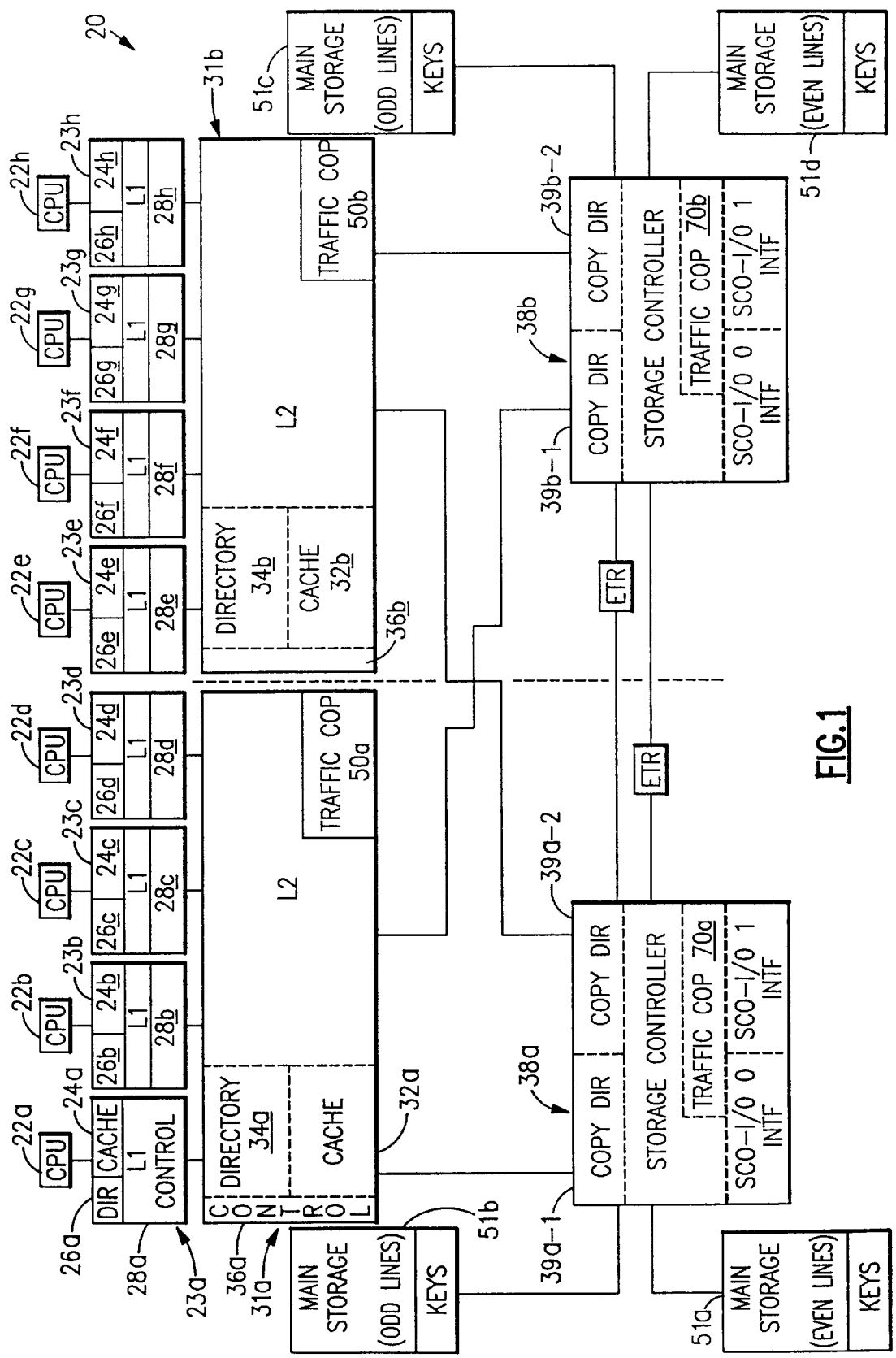
FIG. 1 is a block diagram of a hierarchical two level cache system according to the present invention.

Referring now to the figures in detail wherein like reference numerals indicate like elements throughout the several views, FIG. 1 illustrates a hierarchical cache system generally designated 20 according to the present invention. Cache system 20 comprises eight central processor units (CPUs) 22a–h and eight level-one (L1) cache subsystems 23a–h. Each of the L1 cache subsystems comprises an L1 data or instruction cache 24a–h, a respective L1 directory 2a–h, and a respective L1 cache controller 28a–h. Each of the L1 cache subsystems serves one processor, and is known in the prior art. For example, U.S. Pat. No. 4,719,568 describes such an L1 cache subsystem of L1 cache, L1 directory and L1 cache controller.

In accordance with the present invention, cache system 20 also comprises two level-two (L2) cache subsystems 31a,b. The L2 cache subsystems 31a,b comprise respective data or instruction caches 32a,b, respective L2 directories 34a,b and respective L2 cache controllers 36a,b (including respective "traffic cop" circuits 50a,b). Each of the L2 cache subsystems 31a,b serves a group or cluster of L1 caches. In the illustrated example, there are a total of eight L1 cache subsystems divided into two groups of four, and each group of four is served by a different one of the L2 cache subsystems. Each L2 cache has a total of four L1 cache buses and four sets of I/O pins, one bus and set of I/O pins being dedicated to each of the four L1 cache subsystems served by the L2 cache. By way of example, there are eight pins in each set and the bus is eight bits wide. However, if desired, there can be more (or fewer) L1 cache subsystems (and respective CPUs) and L2 cache subsystems with the same or different ratio as long as each L2 cache subsystem serves more than one L1 cache subsystem. The L2 cache 32a stores a copy of all data read from a main memory portion 51a,b into any of the L1 caches 24a,b,c,d or subsequently updated by CPUs 22a,b,c,d. Likewise, the L2 cache 32b stores a copy of all data read from main memory portion 51c,d into any of the L1 caches 24e,f,g,h or subsequently updated by CPUs 22e,f,g,h.

Cache system 20 also comprises storage controllers 38a,b for L2 cache subsystems 38a,b, respectively. Each of the storage controllers 38a,b serves as an interface between the respective L2 cache subsystem 31a,b, a respective main memory portion 51a,b or 51c,d and the other L2 cache subsystem and the other storage controller. Each of the main memory portions stores data for a respective range of addresses. Storage controller 38a contains copy directories 39a-1,a-2 for addresses in the address range of main memory portion 51a,b which are also stored in L2 caches 31a,b respectively. Copy directories 39a-1,a-2 are limited to addresses from main memory portion 51a,b, even though L2 caches 31a,b typically contain addresses from memory portions 51a,b and 51c,d. Storage controller 38b contains copy directories 39b-1,b-2 for addresses in the address range of main memory portion 51c,d which are also stored in L2 caches 31a,b respectively. Copy directories 39b-1,b-2 in storage controller 38b are limited to addresses from main memory portion 51c,d, even though L2 caches 31a,b typically contain addresses from memory portion 51a,b and 51c,d. Copy directory 39a-2 only contains addresses from main memory portion 51c,d. Storage controller 38a is capable of accessing the data from main memory portion 51a,b but not from main memory portion 51c,d. Storage controller 38b is capable of accessing the data from main memory portion 51c,d but not from main memory portion 51a,b.

The following is a high level flow description with reference to FIG. 1. If one of the CPUs 22a,b,c or d requests data, and the data resides in the respective L1 cache 28a,b,c or d, then the data is read from the L1 cache to the requesting CPU in accordance with the prior art. However, if the requested data does not reside in the L1 cache but does reside in the L2 cache 31a, then the data is read from the L2 cache 31a to the L1 cache of the requesting CPU and then to the CPU. If the data does not reside in either the respective L1 cache or the L2 cache 32a, then one of the storage controllers 38a or 38b (depending on the address of the respective data) searches its own L2 copy directory 39a-1 or 39a-2 to determine if L2 cache 32b has a copy of the requested data. If the data resides in L2 cache 32b, then the responsible L2 storage controller requests the data from L2 cache 32b and the data is copied to the L2 cache 32a and to the L1 cache 26a for access by CPU 22a. In such a case, a time consuming fetch from main memory is avoided. Only, if the requested data is not available in the respective L1 cache or either L2 cache, then it is fetched or inpaged from main memory.

Also, in accordance with the present invention, when any CPU 22a–h modifies data which is stored in either the respective L1 cache or L2 cache, the updates are written to the respective L2 cache. Also, the respective L2 cache controller notifies all other L1 caches that have a copy of the old data in the same cluster and the respective storage controller if the L2 cache status indicates that another copy exists. Then, this storage controller determines if the other L2 cache has a copy of the data, and if so, notifies this other L2 cache controller that its copy of the data is now invalid. Also, this other L2 cache controller notifies the L1 caches that their copy is now invalid. Thus, the two L2 cache subsystems and storage controllers avoid main memory fetches except when neither L2 cache has a copy of the data. Also, the two L2 cache subsystems support eight CPUs and eight respective L1 cache subsystems. If desired, a single storage controller can replace both storage controllers 38a and b. Thus, the number of storage controllers can be less than the number of L2 cache subsystems (or greater). Also, the arrangement is expandable. For example, there could be four L2 cache subsystems, four respective storage controllers, thirty two L1 cache subsystems and thirty two CPUs in clusters of eight. In such a case, each storage controller would maintain a copy directory for each L2 cache and be coupled to all other L2 cache subsystems such that requested data not found in the respective L2 cache could be fetched from any other L2 cache, and data which has been updated in one L2 cache would be invalidated in all other L2 caches that have a copy of the requested data, and L1 caches served by these other L2 caches.

To simplify the figures, virtual to main memory address translation hardware and translation look aside buffers are not shown. They perform the following function. In many computer systems, programs executing on a processor identify data by address operands embedded within an instruction. The address operands are quickly converted by hardware to a "virtual" address, a location in the program's linear address space. Then hardware, with support from the operating system, dynamically translates the virtual address to the corresponding main memory address. The time required to perform the address translation is significant. Therefore, after the translation, the virtual address and the corresponding main memory address or relevant portions thereof, along with the program-specific control information, are stored in a translation lookaside buffer (TLB) for future reference.

Figures 2, 2A:
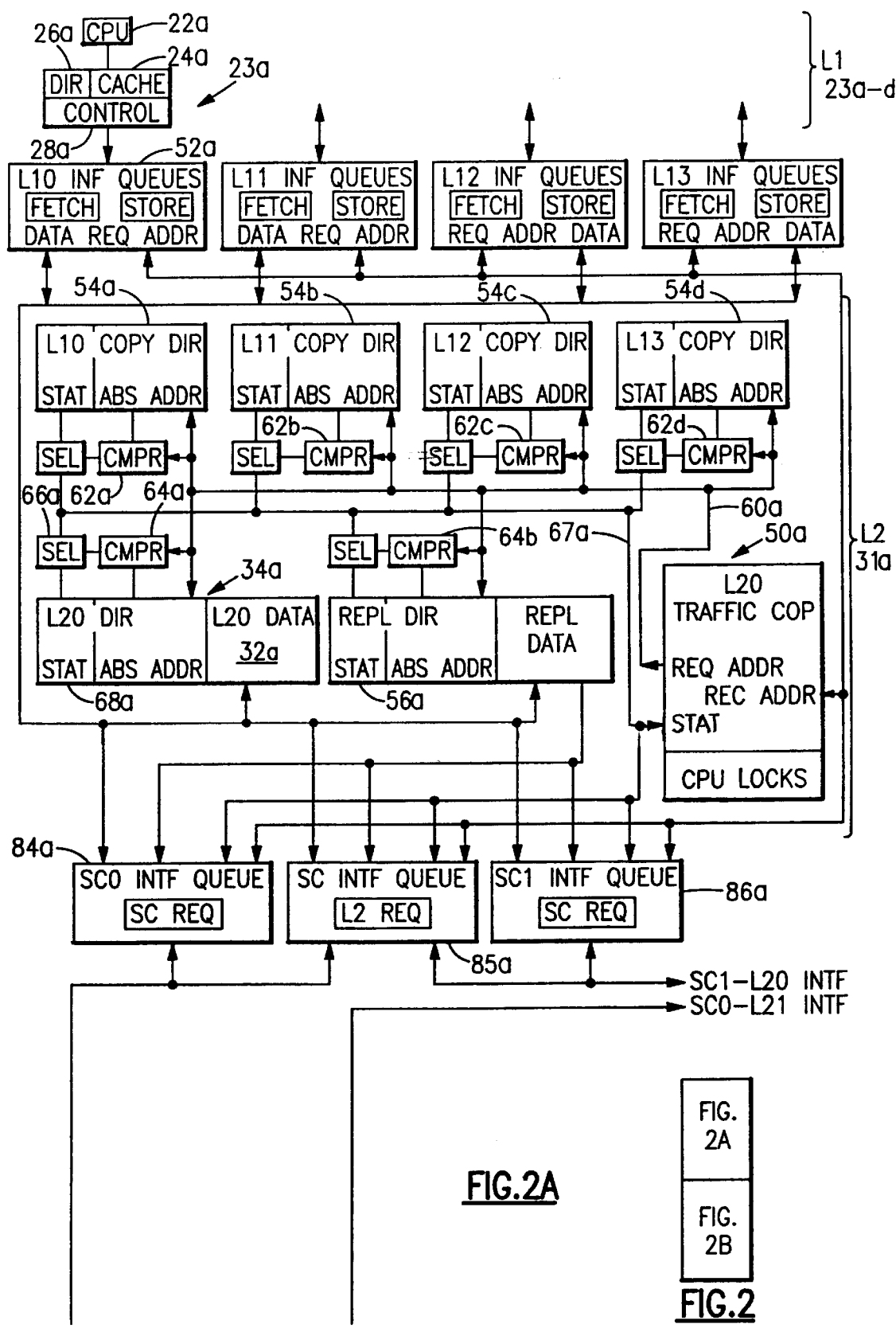
FIG. 2, comprises of FIGS. 2A and 2B, is a more detailed block diagram of the two level cache system of FIG. 1.
Figure 2B:
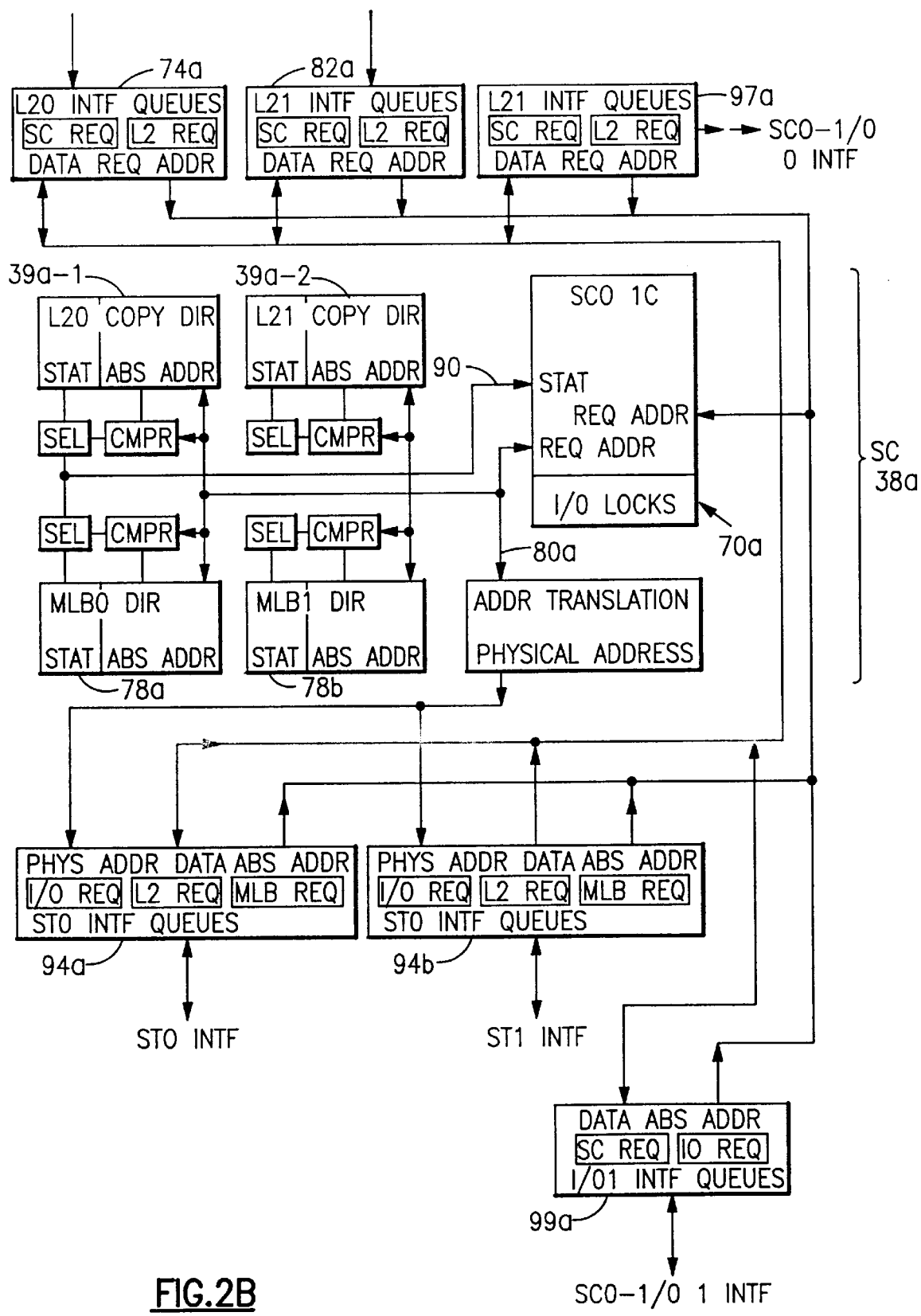

FIG. 2 illustrates hierarchical cache system 20 in more detail. The following is a flow description for a fetch request by CPU 22a. L1 cache controller 28a first checks the local L1 directory 26a for the address of the requested data, and if the data is stored in the L1 cache 24a, provides the data from the L1 cache 23a to the CPU 22a. The foregoing search of the L1 directory and read from the L1 cache was known in the prior art.

However, if the data does not reside in the L1 cache 23a, then the CPU sends the address of the requested data to traffic cop circuit 50a in the L2 cache subsystem 31a via an L10 interface queue 52a. (The traffic cop 50a is the heart of the L2 cache controller 36a shown generally in FIG. 1.) The L2 cache subsystem 31a also comprises an L1 copy directory 54a–d for each of the L1 caches 26a–d, respectively, and an L2 directory 34a. Each of the L1 copy directories stores the addresses of the data stored in the respective L1 cache. The L2 cache subsystem 31a also comprises the L2 directory 34a described above which stores the addresses of all data within the L2 cache 32a and the status of the data in each address, i.e., valid, locked, fetch in progress, or invalidate exclusive. The L2 cache subsystem 31a also comprises a replacement directory 56a which indicates which data has been replaced and whether the replaced data was modified and requires a storage operation to the L3. This storage operation is commonly known as castout. In response to the address of the requested data from the CPU 22a, the traffic cop 50a puts the address on an address bus 60a to be read by comparators 62a–d for L1 copy directories 54a–d, respectively, and comparators 64a–b for L2 directory 34a and replacement directory 56a, respectively. Each of the comparators determines if the respective cache has a copy of the requested data by comparing the requested address to the addresses stored in the directory. If the data resides in the L2 cache 32a, then a selector 66a reads the associated status bits from status array 68a and furnishes them to traffic cop 50a via a status bus 67a. If the data is valid, then traffic cop 50a sends the data from the L2 cache 32a to the L1 cache 24a via a fetch buffer in L1 interface 52a.

However, if the data does not currently reside in L2 cache 32a, the traffic cop 50a compares the requested address to the range of main memory portion 51a,b and the range of main memory portion 51c,d to determine which main memory portion contains the requested address. Then, the traffic cop 50a sends the requested address to the storage controller associated with the main memory portion that contains the requested address. If main memory 51a,b contains the requested address, then traffic cop 50a sends the request to a storage controller traffic cop circuit 70a in the storage controller 38a via a storage controller interface 84 and an L20 interface 74a. In addition to storing addresses of data in L2 caches 31a,b, copy directories 39a-1,2 also store the status of the data in each address, i.e., valid, memory operation, L2 operation invalidate operation, channel store, channel fetch and I/O locks, respectively. Modified line buffer (MLB) directories 78a,b store addresses of modified lines on their way to be stored in main memory and the status of the data in each address, i.e., valid and castout pending. The storage controller traffic cop 70a puts the requested address on address bus 80a to be read by comparators 82a,b for L2 copy directories 39a-1,a-2 respectively and comparators 84a,b, respectively for MLB directories 78a,b, respectively. (However, the requested address will not be found in L2 cache 32a; the comparison to L2 copy directory 39a-1 is always made together with the comparison to L2 copy directory 39a-2.) If L2 copy directory 39a-2 indicates that L2 cache 32b has a copy of the requested data, then a selector 86b passes the associated status bits to traffic cop 70a via status bus 90. Assuming the status is valid, storage controller traffic cop 70a sends the requested address to a traffic cop 50b in L2 cache 31b via L21 interface 82a and SCO interface 84b, and the traffic cop 50b puts the requested address on the address bus 60b. Assuming there is a hit in the L2 cache 32b, the traffic cop 50b sends the data to the storage controller 38a via SCO interface 84b and L21 interface 82a. The storage controller 38a sets the copy bit in copy directory 39a-1, and then sends the requested data to L2 cache 32a via L20 interface 74a and SC interface 84a and to L1 cache 24a via L1 interface 54a. Once in the L2 cache 32a, traffic cop 50a puts the requested address on the address bus 60a, and stores the data in L2 cache 32a.

Referring back to the comparison made to the L2 copy directory 34a, if that comparison indicated that the L2 cache 32b does not have a copy of the requested data, then the data can be fetched from main memory portion 51a,b. Assuming neither of the modified line buffer directories 78a nor b indicates that the respective modified line buffer has a copy of the requested data, then the storage controller traffic cop 70a sends the requested address to storage interface 51a or 51b via interface 94a or 94b to fetch the data from main memory 51a,b.

The following is a flow description of a fetch request from CPU 22e. This request is processed by L1 cache 23e and L2 cache system 31b in an analogous manner to that described above for the fetch request from CPU 22a. In this example, the requested address is not contained in either L1 cache 23e or L2 cache 31b, and it is determined that main memory 51a,b contains the requested address. Consequently, traffic cop 50b in L2 cache subsystem 31b sends the request to storage controller traffic cop circuit 70a in storage controller 38a via a storage controller interface 86a and an L20 interface. Then, traffic cop 70a puts the requested address on an address bus to be read by comparators 82a,b for L2 copy directories 29a-1,a-2 and comparators 84a,b, respectively for MLB directories 78a,b, respectively. (However, the requested address will not be found in L2 cache 32b; the comparison to L2 copy directory 39a-2 is always made together with the comparison to L2 copy directory 39a-1.) If L2 copy directory 39a-1 indicates that L2 cache 32a has a copy of the requested data, then a selector 86b passes the associated status bits to traffic cop 70a via status bus 90. Assuming the status is valid, storage controller traffic cop 70a sends the requested address to traffic cop 50a in L2 cache 31a via L20 interface 84a, and the traffic cop 50a puts the requested address on the address bus 60a. Assuming there is a hit in the L2 cache 32a, traffic cop 50a sends the data to the storage controller 38a. The storage controller 38a sets the copy bit in copy directory 39a-2, and then sends the requested data to L2 cache 32b via SC interface 86a and L21 interface. Once in the L2 cache 32b, traffic cop 50b in L2 cache system 31b puts the requested address on an address bus, and stores the data in L2 cache 32b. Next, traffic cop 50b sends the requested data to L1 cache 26e for access by CPU 22e.

Referring back to the comparison made to the L2 copy directory 34a, if that indicated that L2 cache 32a does not have a copy of the requested data, then the data can be fetched from main memory portion 51a,b. Assuming neither of the modified line buffer directories 78a nor b indicates that the respective modified line buffer has a copy of the requested data, then the storage controller traffic cop 70a requests the data from main memory 51a,b via interface 94a and updates copy directory 38a-2 to indicate that L2 cache subsystem 31b will contain the data. Then traffic cop 70a sends the requested address and data to traffic cop 70b in storage controller 38b which sends the requested address and data to L2 cache subsystem 31b. Then, traffic cop 50b in L2 cache subsystem 31b sends the requested address and data to L1 cache 23e for access by CPU 22e.

The following is a flow description for a store or update request by CPU 22a. The request is sent directly to the L1 cache controller 28a and also to the traffic cop 50a via L1 interface 54a. L1 cache controller 28a first checks the local L1 directory 26a for the address of the requested data, and if the data is stored in the L1 cache, the data is updated in the L1 cache and a lock bit is set in L1 directory 26a. As described in more detail below, this data in the L1 cache 24a will be locked and therefore, inaccessible until the copy in the L2 cache is updated, and all the other copies in the other L2 and L1 caches are invalidated. While the request is being processed in the L1 cache subsystem 23a, the traffic cop 50a puts the address on the address bus 60a to determine if the data resides in either or both of the L2 caches. If the data resides in the L1 cache 24a, then the data will also reside in L2 cache 32a, but may or may not reside in L2 cache 32b. The contents of the L2 directory 34a indicates whether the data resides in the L2 cache 32a. If a copy bit is set in the corresponding location in the status array 68a for L2 directory 34a, then the data also resides in the other L2 cache 32b. Assuming the copy resides in the L2 cache 32a, then the copy is written into a buffer in L1 interface 54a, merged with the updates in this buffer and then the updated copy is written into the L2 cache 32a. Then, the traffic cop 50a sends an invalidate signal to each L1 cache controller 28b,c and/or d that has a copy of the data without the update. The identity of these L1 caches 28b,c and/or d is indicated by the comparison of the data address with the contents of the respective L1 copy directories 54b,c and or d. The traffic cop also signals the requesting L1 cache 28a that the store has completed successfully thus unlocking the address and allowing CPU 22a to use the data.

If the copy bit was set in the status array 68a for L2 directory 34a (indicating that at least one other L2 cache has a valid copy of the data, but not any particular one if there is more than one other), then the traffic cop 50a sends an invalidate exclusive (IE) signal and address to the traffic cop of the storage controller that owns the address of the data, in this case, traffic cop 70a of storage controller 38a via SC interface 85a and L20 interface 74a.

In response, traffic cop 70a compares the address to the contents of L2 copy directory 39a-2 to determine if the data is stored in L2 cache 32b. (There is one L2 copy directory 39 in storage controller 38a for each L2 cache subsystem that exists and lists the addresses from main memory portion 51a,b (but not in main memory portion 51c,d) stored by the respective L2 cache.) If the data is stored in the L2 cache 32b, the storage controller traffic cop 70a sends the invalidate exclusive signal and address to traffic cop 50b via L21 interface 82a and SCO interface 85b, and the traffic cop 50b puts the address on address bus 60b. Assuming there is a hit for the L2 cache 32b, the traffic cop 50b puts the invalidate signal on status bus 67b and the invalidation signal is read into status array 68b. If there is a hit on any of the L1 copy directories 54e–h, then the traffic cop 50b also sends an invalidate signal to the respective L1 cache controllers 28e–h via the respective L1 interface 54e–h. After all the copies within L2 cache 32b and the associated L1 caches are marked invalid, the traffic cop 50b returns a completion signal to traffic cop 70a. In response, traffic cop 70a updates the status for this data in copy directory 39a-2 as invalid (so there would be a miss if requested), and sends the acknowledgement to traffic cop 50a. In response, traffic cop 50a resets the copy bit in L2 status array 68a to indicate no copy exists elsewhere, marks the status in array 68a as modified, stores the data in the L2 cache 32a, and sends a validate signal to L1 controller 28a to reset the lock in the L1 cache 24a.

If the data did not reside in either the L1 cache 24a or the L2 cache 32a, then the address comparison in the L1 directory 26a and the L2 directory 34a will indicate misses and the traffic cop 50a will send a fetch exclusive (FE) request and address to storage controller traffic cop 70a via storage controller interface 84a and L20 interface 74a. Then, the traffic cop 70a will put the address on address bus 80a to determine if the data resides in L2 cache 32b, as indicated by L2 copy directory 39a-2. If so, traffic cop 70a will forward the fetch exclusive signal to traffic cop 50b via L21 interface 82a and SC interface 85b. Then, traffic cop 50b puts the address on address bus 60b. Assuming there is a hit in the L2 directory 34b, the data is marked invalid in status array 68b, read from L2 cache 32b and sent by traffic cop 50b to a buffer in L20 interface 74a via SC interface 84a. Traffic cop 70a then updates the status in copy directories L20 39a-1 to indicate a hit, and L21 39a-2 to indicate invalid data. The data is then sent to a buffer in L1 interface 54a via SC interface 84a. Once in the buffer, the data is merged with the updates from CPU 22a and then the traffic cop 50a reads the merged data from the buffer and writes it into L2 cache 32a and sends a validate signal to L1 controller 28a to reset the lock in the L1 cache 24a.

If the data did not reside in either the L1 cache 24a, L2 cache 32a or L2 cache 32b, then the address comparison in storage controller 38a will indicate a miss for L2 copy directories 39a-1,2 and a miss for modified line buffer directory 78a or 78b. Then, traffic cop 70a sends the address (after translation by a physical address translator 92a) and the fetch exclusive request to main memory portion 51a,b via main memory interface 94a,b. The data is returned to the buffer in the L1 interface 54a via L2 interface 74a, SC interface 84a and L1 interface 54a. Once in the buffer, the data is merged with the updates from CPU 22*a* and then the traffic cop 50*a* reads the merged data from the buffer and writes it into L2 cache 32*a*, and sends a validate signal to L1 controller 28 to reset the lock in the L1 cache 24*a*.

FIG. 2 also illustrates I/O interface queues 97*a* and 99*a* which handle I/O operations.

Figure 3B:
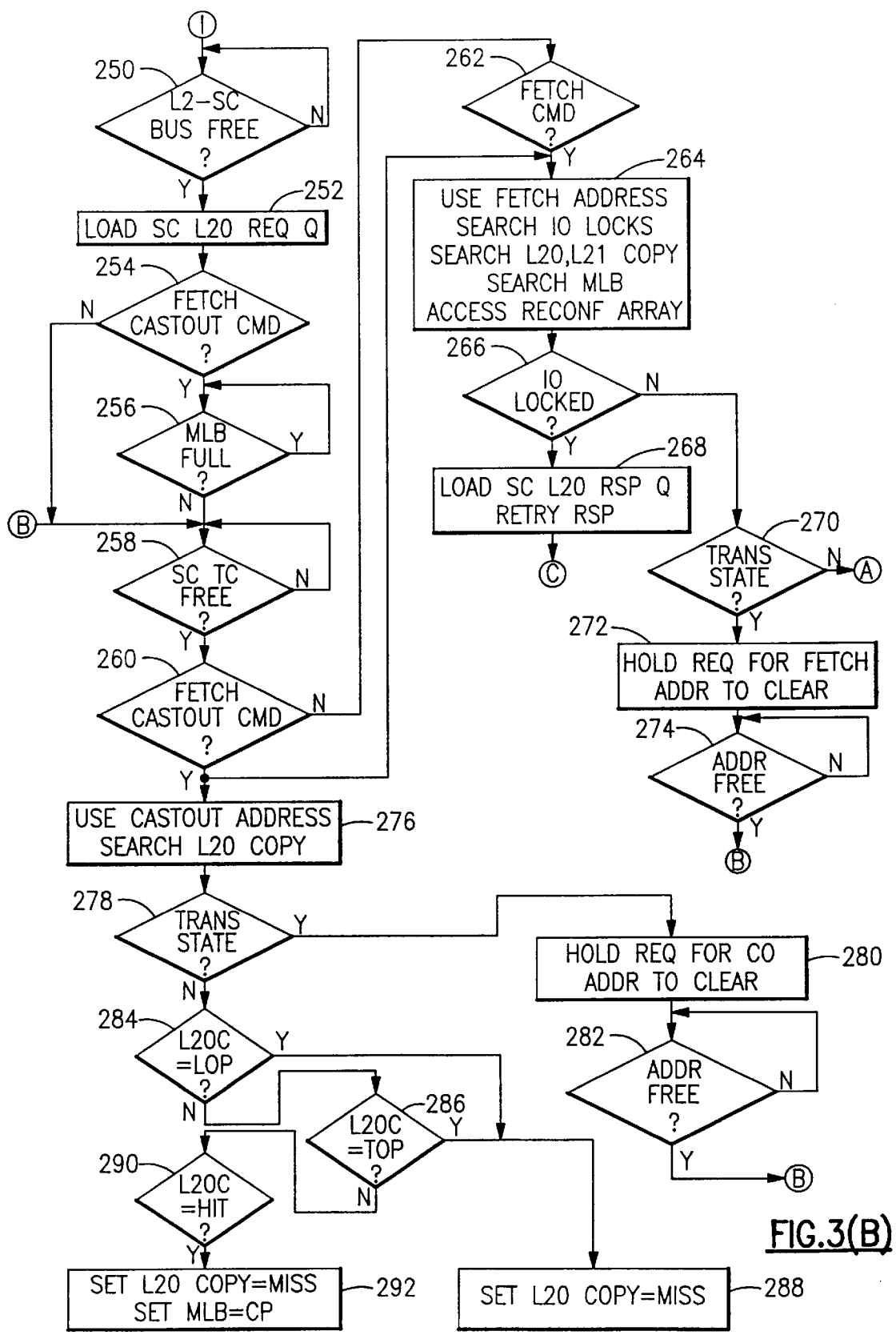
FIGS. 3, comprises of FIGS. 3(A)A–B, 3B, 3(C)A–B, 3(D)A–B and 3E, form a flow chart which illustrate fetch operations of the hardware within the two level cache system of FIG. 2.
Figure 3E:
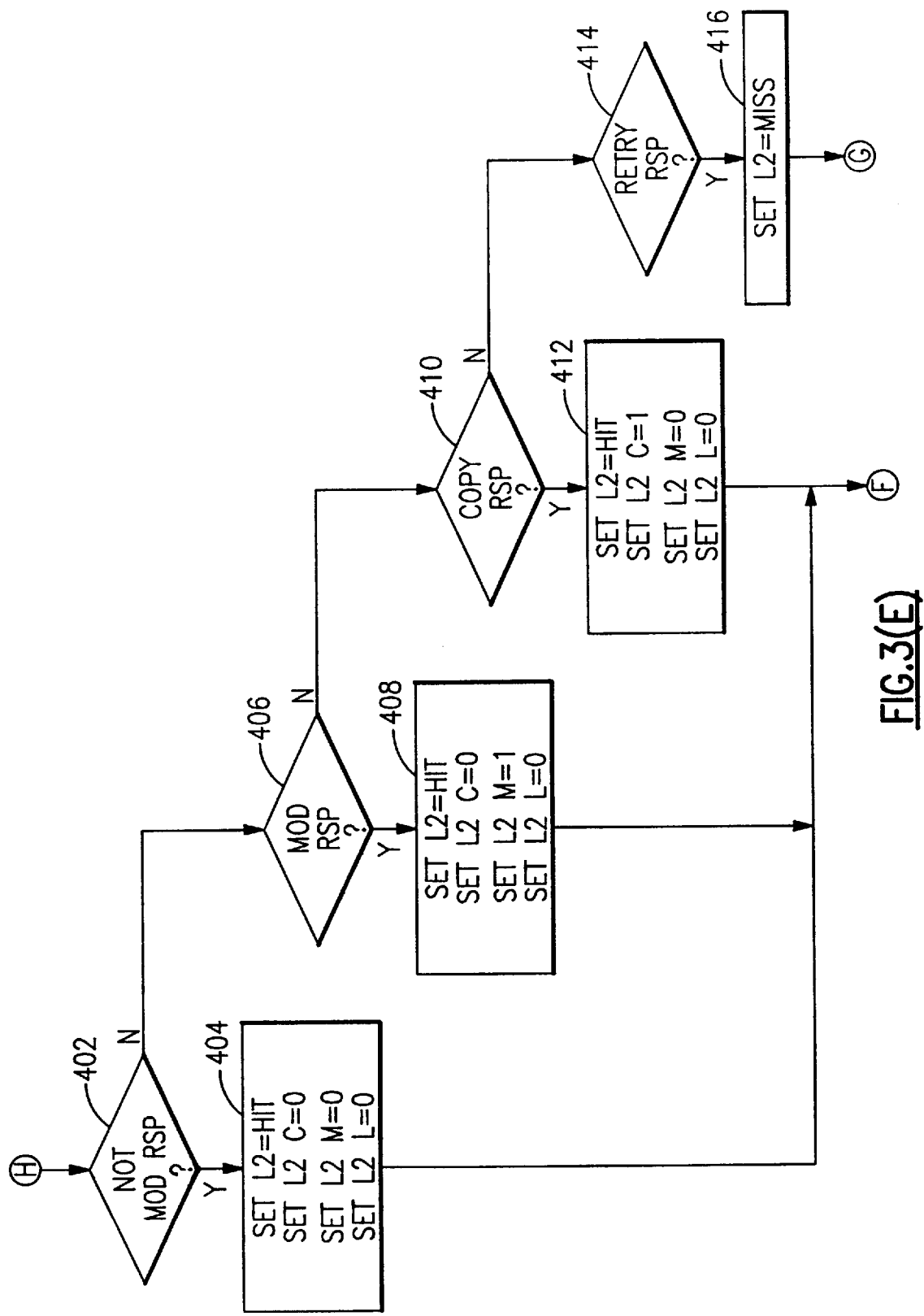
Figure 4B:
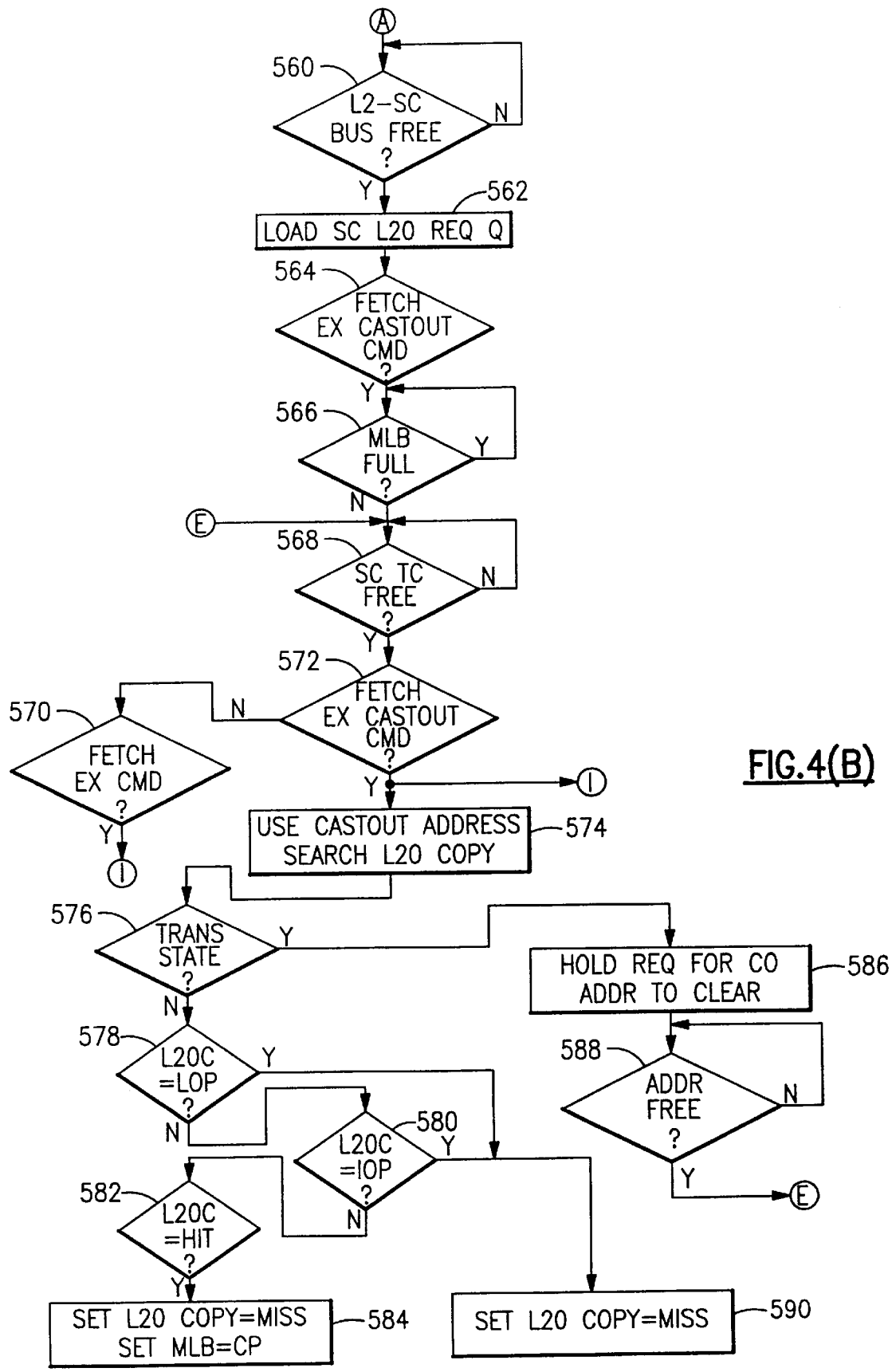
FIGS. 4, comprises of FIGS. 4(A)A–B, 4B, 4C, 4D, 4E, 4F and 4G form a flow chart which illustrates store operations of the hardware within the two level cache system of FIG. 2.
Figure 4C:
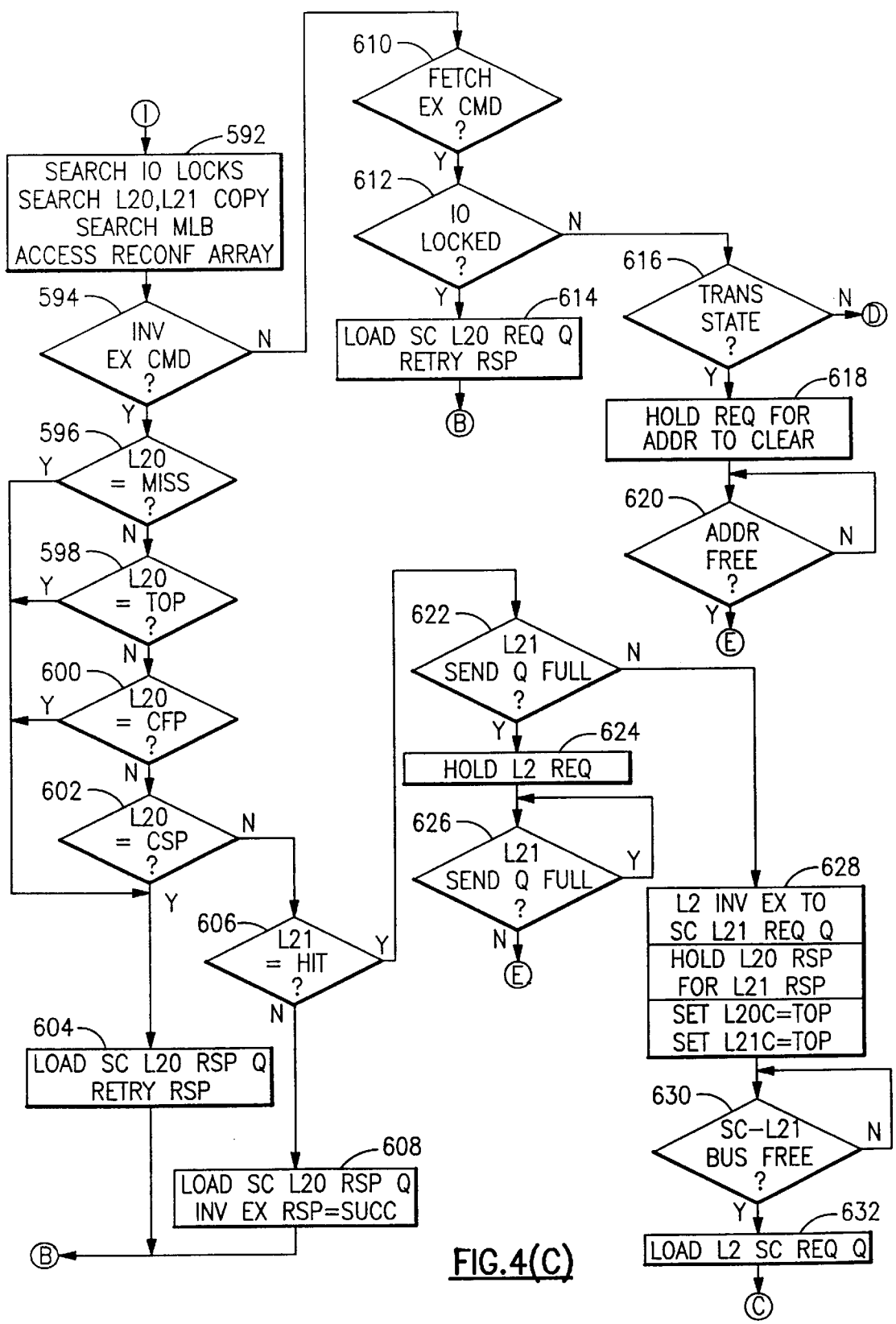
Figure 4D:
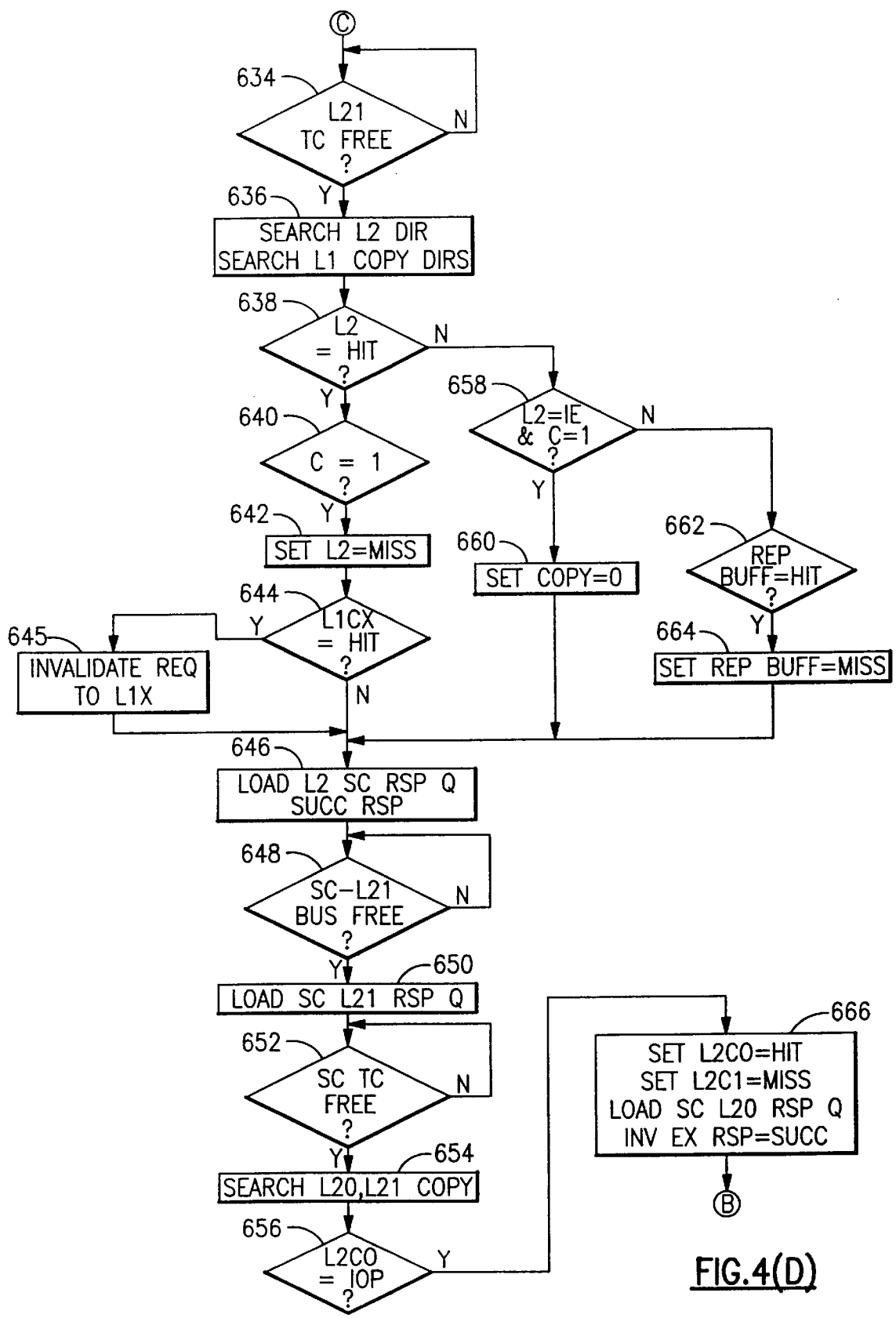
Figure 4E:
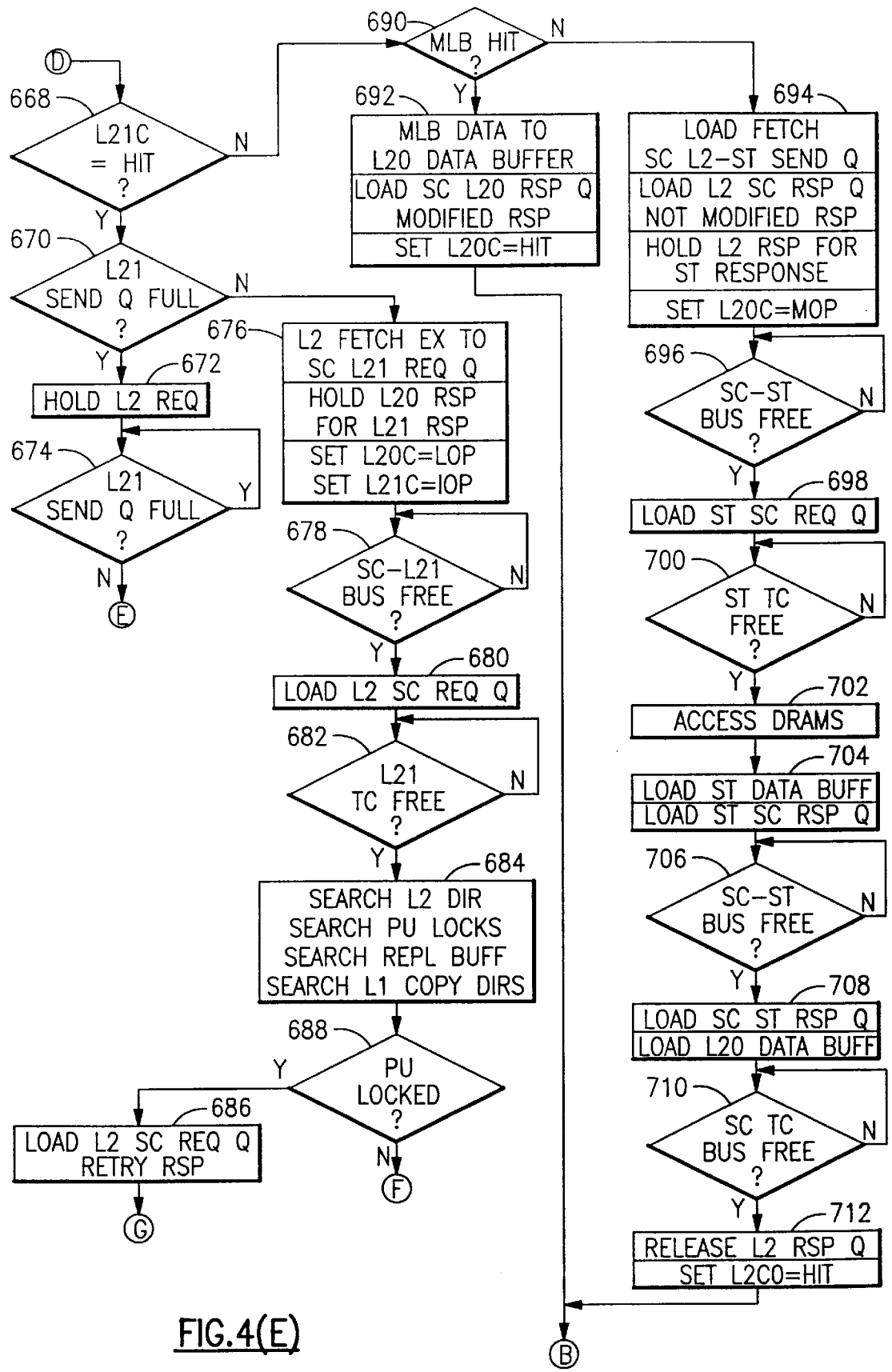
Figure 4F:
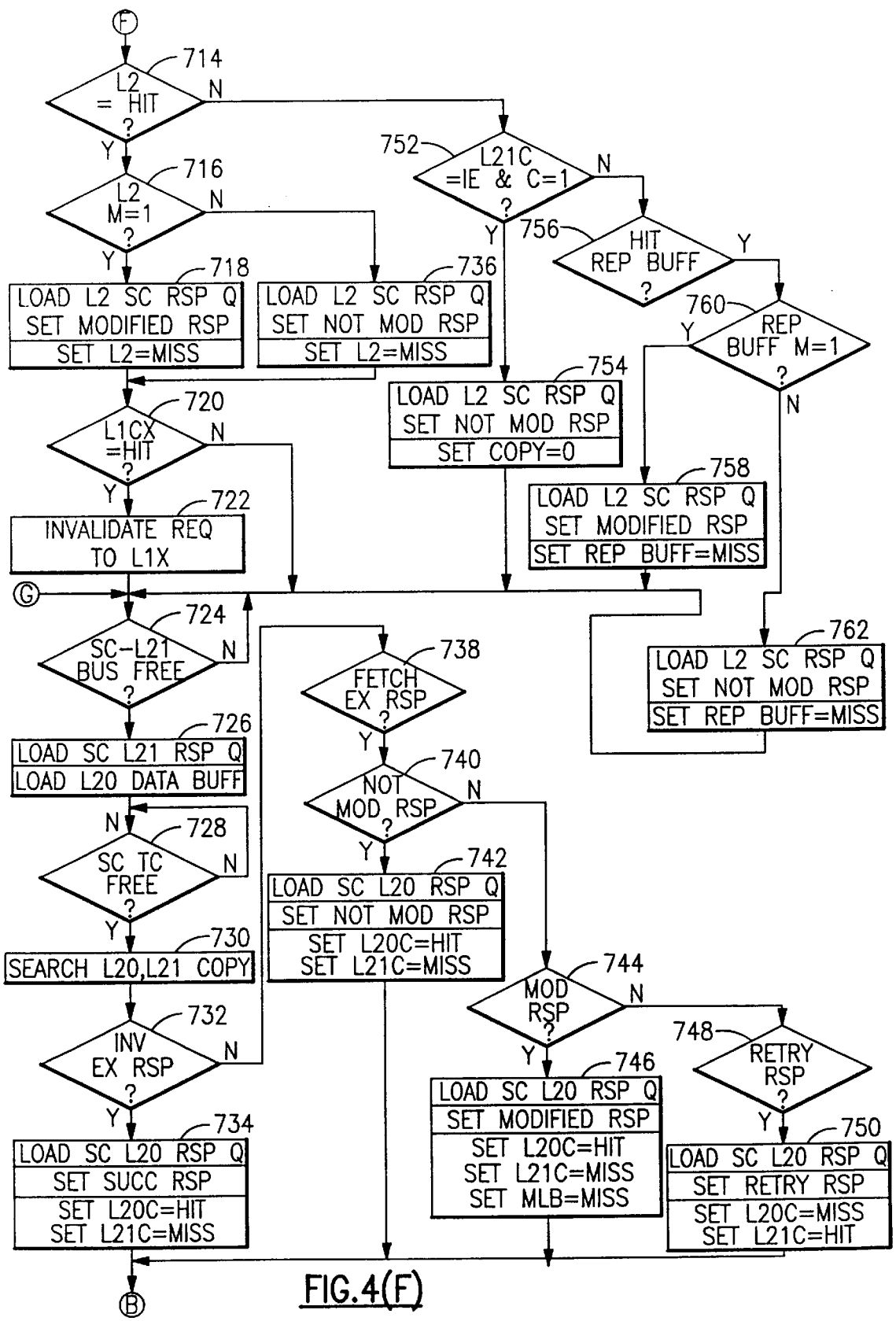
Figure 4G:
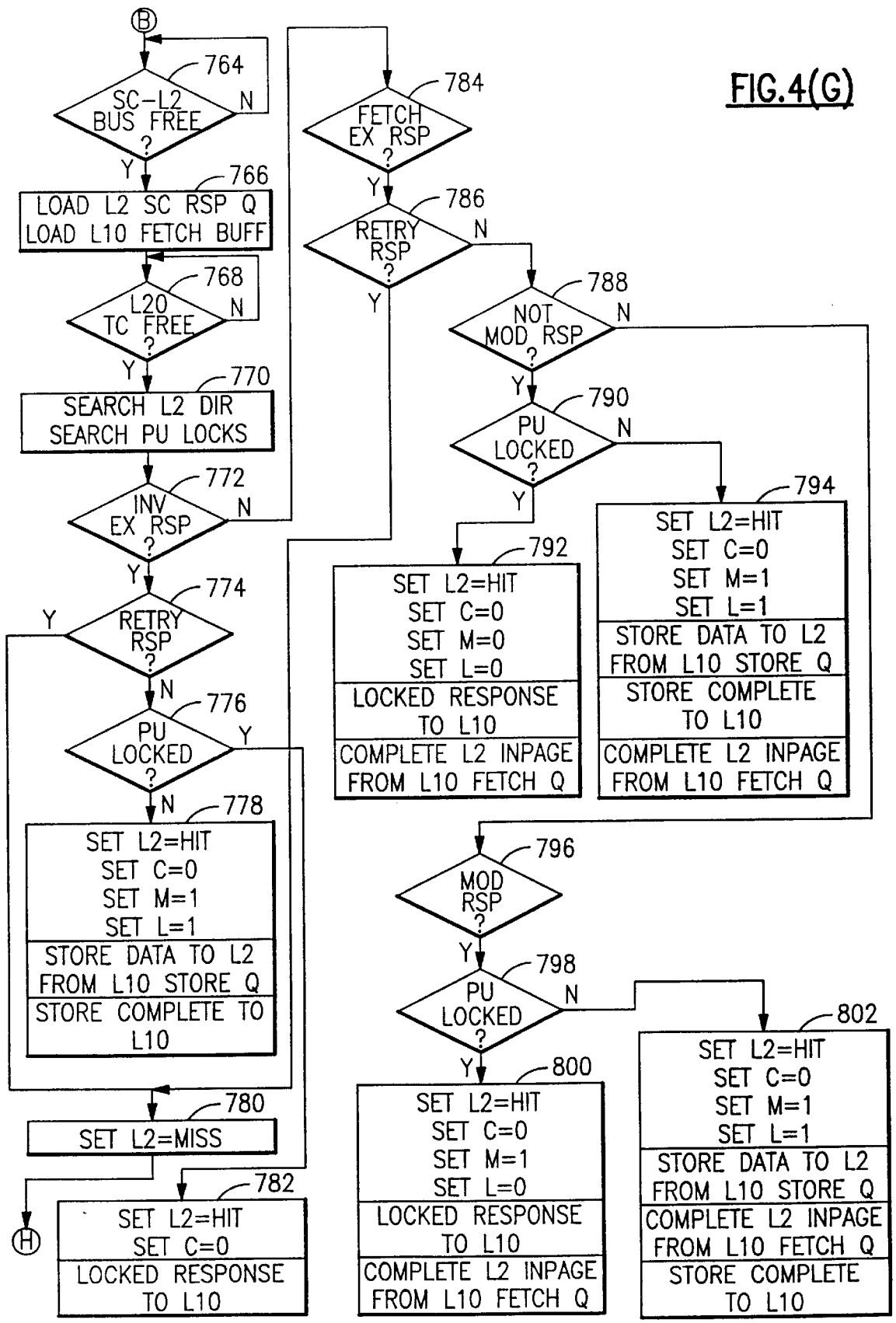

FIGS. 3(*a–e*) form a highly detailed flow chart describing use of the hardware of FIG. 2 in the foregoing fetch operation. The following table 1 defines each of the steps of FIGS. 3(*a–e*).

TABLE 1

Processor Fetch, L1 Cache Miss Flowchart Description

| NUMBER | Description |
|---|---|
| 200 | L1 Miss Fetch request from PU 0 |
| 202 | Is the bus between the L1 and L2 available? |
| 204 | The bus between the L1 and L2 is available. Load the fetch request into the L1 fetch queue in the L2. |
| 206 | Is the L2 "traffic cop" free to take the request? |
| 208 | Search the L2 directory, the Replacement buffer directory, and the reconfiguration array. |
| 210 | Is the line in a transition state? |
| 212 | Line is in transition, hold operation until line is in a steady state. |
| 214 | Is line in steady state? |
| 216 | Is the line in the L2? |
| 218 | The line is in the L2. 1st quadword of data sent to L1 if PU bus is free. Load the fetch buffer at the PU interface. Set the L1 copy directory for the PU to a HIT state. |
| 220 | Is the PU bus free? |
| 222 | When the PU bus is free, send the data to the L1 cache. |
| 224 | The line is not in the L2 Cache. Set the state for the line to be fetched to FP (fetch in progress) |
| 226 | Is the line that is to be replaced in the L2 modified? |
| 228 | The replaced line is modified. Load the replacement buffer with the line that is to be replaced. Set the replacement buffer directory to HIT,MOD. |
| 230 | The replaced line is not modified. Load the replacement buffer with the line that is to be replaced. Set the replacement buffer directory to HIT |
| 231 | Compare the fetch address from L20 against the SC address ranges to determine which SC can access the data |
| 232 | Compare the castout address from L20 against the SC address ranges to determine which SC can access the data Is the replaced modified line in the same SC as the line that is to be fetched? |
| 232A | Compare the castout address from L20 against the SC address ranges to determine which SC can access the data Is the replaced modified line in the same SC as the line that is to be fetched? |
| 234 | The replaced line is in the same SC. Load the L2 SC0 request queue with a Fetch and Castout command. |
| 235 | The replaced line is in the same SC. Load the L2 SC1 request queue with a Fetch and Castout command. |
| 236 | The replaced line is in the same SC. Load the L2 SC0 request queue with a Castout command. |
| 237 | The replaced line is in the same SC. Load the L2 SC1 request queue with a Castout command. |
| 238 | The replaced line is not in the same SC. Load the L2 SC0 request queue with a Fetch command. |
| 239 | The replaced line is not in the same SC. Load the L2 SC1 request queue with a Fetch command. |
| 240 | The replaced line is not in the same SC. Load the L2 SC1 request queue with a Castout command |
| 241 | The replaced line is not in the same SC. Load the L2 SC0 request queue with a Castout command |
| 242 | Compare the fetch address from L20 against the SC address ranges to determine which SC can access the data |
| 243 | Compare the castout address from L20 against the SC address ranges to determine which SC can access the data. |

TABLE 1-continued

Processor Fetch, L1 Cache Miss Flowchart Description

| NUMBER | Description |
|---|---|
| | Is the replaced modified line in the same SC as the line that is to be fetched? |
| 243A | Compare the castout address from L20 against the SC address ranges to determine which SC can access the data Is the replaced modified line in the same SC as the line that is to he fetched? |
| 244 | The replaced line is in the same SC. Load the L2 SC0 request queue with a Fetch command. |
| 245 | The replaced line is in the same SC. Load the L2 SC1 request queue with a Fetch command. |
| 246 | The replaced line is not in the same SC. Load the L2 SC0 request queue with a Fetch command. |
| 247 | The replaced line is not in the same SC. Load the L2 SC1 request queue with a Fetch command. |
| 248 | The replaced line is not in the same SC. Load the L2 SC1 request queue with a Replace command. |
| 249 | The replaced line is not in the same SC. Load the L2 SC0 request queue with a Replace command. |
| 250 | Is the bus between the L2 and SC available? |
| 252 | Load the SC L2 request queue. |
| 254 | Is the request in the SC L2 request queue a Fetch and Castout command? |
| 256 | Request is a Fetch and Castout command. Is the Modified Line Buffer full? |
| 258 | Is the SC "traffic cop" free? |
| 260 | Is the request a Fetch and Castout command? |
| 262 | Is the request a Fetch command? |
| 264 | Using the Fetch line address Search the L2 copy directories. Search the I/O locks. Search the Modified Line Buffer. Access the reconfiguration array. |
| 266 | Is the line locked by the I/O? |
| 268 | The line is locked by the I/O. Load the SC L2 response queue with a Retry response |
| 270 | The line is not locked by the I/O. Is the line in a transition state? |
| 272 | The line is in a transition state. Hold the request at the SC L2 request queue until the state of the line is resolved. |
| 274 | Is the state of the line resolved? |
| 276 | The request is a Fetch and Castout command. Use state of replaced line. |
| 278 | Is the state of the replaced line in a channel transition state? |
| 280 | The state of the replaced line is in a channel transition state. Hold the Fetch and Castout command until the state of the replacement line is resolved. |
| 282 | Is the state of the replacement address resolved? |
| 284 | Is the state of the replacement address LOP? |
| 286 | Is the state of the replacement address IOP? |
| 288 | The state of the replacement address is either LOP or IOP. Set the state of the requesting L2 Copy directory to MISS. |
| 290 | Is the state of the replacement address HIT? |
| 292 | The state of the replacement address is HIT. Set the state of the requesting L2 Copy directory to MISS. Set the state of the Modified Line Buffer to CP (Castout in Progress). |
| 294 | Is there a copy of the line in the other L2? |
| 296 | There is not a copy of the line in the other L2. Is there a copy of the line in the Modified Line Buffer? |
| 298 | There is a copy of the line in the Modified Line Buffer. Load the line from the Modified Line Buffer to the L2 Interface Fetch Buffer. Load the SC L2 response queue with a Not Modified Response. Set the requesting L2 Copy directory to HIT state. |
| 300 | There is not a copy of the line in the Modified Line Buffer. Load the Storage SC L2 request queue with Fetch command. Load the SC L2 response queue with Not Modified response. Hold the L2 response for the Storage response for the Fetch command. Set the requesting L2 Copy directory state to MOP (Memory Operation in Progress). |
| 302 | Is the SC Storage Bus available? |
| 304 | The SC Storage Bus is available. |

TABLE 1-continued

Processor Fetch, L1 Cache Miss Flowchart Description

| NUMBER | Description |
|---|---|
|  | Load the Storage SC request queue with the Fetch command. |
| 306 | There is a copy of the line in the other L2. |
|  | Is the other L2's SC request queue full? |
| 308 | The other L2's SC request queue is full. |
|  | Hold the request at the SC L2 request queue until the other L2's SC request queue is available. |
| 310 | Is the other L2's SC request queue full? |
| 312 | The other L2's SC request queue is available. |
|  | Load the other L2's SC request queue with the Fetch command. |
|  | Hold the requesting L2's response for the Other L2's response to the Fetch command. |
|  | Set the requesting L2's and the other L2's Copy directory state to LOP (L2 Operation in Progress). |
| 314 | Is the other L2's SC L2 bus available? |
| 316 | The other L2's SC L2 bus is available. |
|  | Load the other L2's L2 SC request queue with the Fetch command. |
| 318 | Is the other L2's "traffic cop" available? |
| 320 | The other L2's "traffic cop" is available. |
|  | Search the L2 directory. |
|  | Search the PU Locks. |
|  | Search the Replacement Buffer directory. |
|  | Search the L1 Copy directories. |
| 322 | Is the line locked by a PU Lock? |
| 324 | The line is not locked by a PU Lock. |
|  | Is there a HIT state in the L2 directory? |
| 326 | There is a HIT state in the L2 directory. |
|  | Is the line modified? |
| 328 | The line is modified. |
|  | Has the line been modified locally? |
| 330 | The line has been modified. |
|  | Load the L2 SC response queue with a Modified response. |
|  | Set the L2 and Replacement Buffer directories state to MISS. |
|  | Invalidate all L1 copies and set L1 Copy directories state to MISS. |
| 332 | The line has not been modified locally. |
|  | Load the L2 SC response queue with a Copy and Store response. |
|  | Set the L2 directory state Copy bit. |
| 334 | There is not a HIT state in the L2 directory. |
|  | Is there an IE (Invalidate Exclusive) state with the Copy bit in the L2 directory? |
| 336 | There is not an IE (Invalidate Exclusive) state with the Copy bit in the L2 directory? |
|  | Is there a HIT state in the Replacement Buffer directory? |
| 338 | There is a HIT state in the Replacement Buffer directory. |
|  | Is the line modified? |
| 340 | The line is not modified in the Replacement Buffer. |
|  | Load the L2 SC response queue with Not Modified response. |
| 342 | The state of the line is either not modified or IE with the Copy bit set in the L2 directory. |
|  | Load the L2 SC response queue with Copied response. |
|  | Set the Copy bit in the L2 directory. |
| 344 | The line is locked by a PU. |
|  | Load the L2 SC response queue with Retry response. |
| 346 | Is the Storage "traffic cop" available? |
| 348 | The Storage "traffic cop" is available. |
|  | Access the memory to fetch the line. |
| 350 | Load the Storage Data Buffer with the data from the memory. |
|  | Load the Storage SC response queue with Not Modified response. |
| 352 | Is the SC Storage bus available? |
| 354 | The SC Storage bus is available? |
|  | Load the SC Storage response queue with the Storage response. |
|  | Load the requesting L2 Data Buffer with the data. |
| 356 | Is the SC "traffic cop" available? |
| 358 | The SC "traffic cop" is available. |
|  | Release the requesting L2 response in the L2 response queue. |
|  | Set the requesting L2 Copy directory state to HIT. |
| 360 | Is the SC L2 bus available? |
| 362 | The SC L2 bus is available. |
|  | Load the L2 SC response queue with the SC response. |
|  | If data is associated with response, load the requesting L1 Fetch Buffer with the data, |
|  | If the PU bus is available, send the 1st quadword of data to the requesting L1. |
| 364 | Is the L2 "traffic cop" available? |
| 366 | Is the other L2's SC L2 bus available? |
| 368 | The other L2's SC L2 bus is available. |
|  | Load the other L2's SC response queue. |
|  | Load the requesting L2's Data Buffer with the data associated with the response. |
| 370 | Is the response a Copy and Store response? |
| 372 | The response is a Copy and Store response. |
|  | Is the Modified Line Buffer full? |
| 374 | The Modified Line Buffer is not full. |
|  | Is the SC "traffic cop" available? |
| 376 | The SC "traffic cop" is available. |
|  | Search the L2 Copy directories. |
|  | Search the Modified Line Buffer's directory. |
| 378 | Is the response a Not Modified response? |
| 380 | The response is a Not Modified response. |
|  | Load the requesting L2's response queue with a Not Modified response. |
|  | Set the requesting L2's Copy directory state to HIT. |
|  | Set the other L2's Copy directory state to MISS. |
| 382 | Is the response a Modified response? |
| 384 | The response is a Modified response. |
|  | Load the requesting L2's response queue with a Modified response. |
|  | Set the requesting L2's Copy directory state to HIT. |
|  | Set the other L2's Copy directory state to MISS. |
|  | Set the Modified Line Buffer's directory state to MISS |
| 386 | Is the response a Copy and Store response. |
| 388 | The response is a Copy and Store response. |
|  | Load the requesting L2's response queue with a Copied response. |
|  | Load the Modified Line Buffer with the data associated with the response. |
|  | Set the requesting L2's Copy directory state to HIT. |
|  | Set the other L2's Copy directory state to HIT. |
|  | Set the Modified Line Buffer's directory state to HIT. |
| 390 | Is the response a Copied response? |
| 392 | The response is a Copied response? |
|  | Is the Other L2's Copy directory state LOP (L2 Operation in Progress)? |
| 394 | The Other L2's Copy directory state is LOP (L2 Operation in Progress). |
|  | Load the requesting L2's response queue with a Copied response. |
|  | Set the requesting L2's Copy directory state to HIT. |
|  | Set the other L2's Copy directory state to HIT. |
| 396 | The Other L2's Copy directory state is not LOP (L2 Operation in Progress). |
|  | Load the requesting L2's response queue with a Not Modified response. |
|  | Set the requesting L2's Copy directory state to HIT. |
|  | Set the other L2's Copy directory state to MISS. |
| 398 | Is the response a Retry response? |
| 400 | The response is a Retry response. |
|  | Load the requesting L2's response queue with a Retry response. |
|  | Set the requesting L2's Copy directory state to MISS. |
|  | Set the other L2's Copy directory state to HIT. |
| 402 | The L2 "traffic cop" is available. |
|  | Is the response a Not Modified response? |
| 404 | The response is a Not Modified response. |
|  | Set the L2 directory state to HIT |
|  | Reset the Copy bit. |
|  | Reset the Modified bit. |
|  | Reset the Local bit. |
| 406 | Is the response a Modified response? |
| 408 | The response is a Modified response. |
|  | Set the L2 directory state to HIT |
|  | Reset the Copy bit. |
|  | Set the Modified bit. |

TABLE 1-continued

Processor Fetch, L1 Cache Miss Flowchart Description

| NUMBER | Description |
|---|---|
|  | Reset the Local bit. |
| 410 | Is the response a Copied response? |
| 412 | The response is a Copied response.<br>Set the L2 directory state to HIT<br>Set the Copy bit.<br>Reset the Modified bit.<br>Reset the Local bit. |
| 414 | Is the response a Retry response? |
| 416 | The response is a Retry response.<br>Set the L2 directory state to MISS. |

FIGS. 4(a–g) form a highly detailed flow chart describing use of the hardware of FIG. 2 in the foregoing store operation. The following table 2 defines each of the steps of FIGS. 4(a–g).

TABLE 2

Processor Store L1 Cache Miss Flowchart Description

| NUMBER | Description |
|---|---|
| 500 | L1 Miss Store request from PU 0 |
| 502 | Is the bus between the L1 and L2 available? |
| 504 | The bus between the L1 and L2 is available.<br>Load the store request into the L1 store queue in the L2. |
| 506 | Is the L2 "traffic cop" free to take the request? |
| 508 | Search the L2 directory, the L1 Copy directories,<br>the Replacement buffer directory, the<br>PU Locks, and the reconfiguration array. |
| 510 | Is the line locked by another PU? |
| 512 | Is the line in a transition state? |
| 514 | Is the line in the L2O Directory? |
| 516 | Is the line in the L1 Copy Directory? |
| 518 | Send Invalidate request to L1's which have a copy of the line. |
| 520 | Is the Copy Bit in the L2O Directory on? |
| 522 | Store data into L2 Cache from L1O Store Queue<br>Send Store Complete indication to L1O. |
| 524 | Is the Fetch Pending Bit in the L2O Directory on? |
| 526 | Line is Locked, hold operation until line is unlocked. |
| 528 | Is locked line unlocked? |
| 530 | Line is in transition, hold operation until line is in a steady state. |
| 532 | Does address indicate line is in a steady state? |
| 534 | Is line to be replaced in L2 Cache modified? |
| 536 | Load Replacement Buffer with modified Line to be replaced.<br>Set line status in Replacement Buffer directory to<br>hit and modified. |
| 538 | Load Invalidate Exclusive request into L2O Send Queue<br>Set the state for the line to be invalidated to IE (Invalidate Exclusive) |
| 540 | Compare the fetch address from L2O against the SC address ranges<br>to determine which SC can access the data |
| 541 | Compare the castout address from L2O against the SC address ranges<br>to determine which SC can access the data<br>Is the replaced modified line in the same SC as the line that is to be fetched? |
| 541A | Compare the castout address from L2O against the SC address ranges<br>to determine which SC can access the data<br>Is the replaced modified Line in the same SC as the Line that is to be fetched? |
| 542 | The replaced line is in the same SC.<br>Load the L2 SC0 request queue with a Fetch Exclusive and Castout command. |
| 543 | The replaced line is in the same SC.<br>Load the L2 SC1 request queue with a Fetch Exclusive and Castout command. |
| 544 | The replaced line is in the same SC.<br>Load the L2 SC0 request queue with a Castout command. |
| 545 | The replaced line is in the same SC.<br>Load the L2 SC1 request queue with a Castout command |
| 546 | The replaced line is not in the same SC.<br>Load the L2 SC0 request queue with a Fetch Exclusive command. |
| 547 | The replaced line is not in the same SC.<br>Load the L2 SC1 request queue with a Fetch Exclusive command. |
| 548 | The replaced line is not in the same SC.<br>Load the L2 SC1 request queue with a Castout command |
| 549 | The replaced line is not in the same SC.<br>Load the L2 SC0 request queue with a Castout command |
| 550 | Load Line to be replaced in L2 Replacement Buffer<br>Set the state of line in Replacement directory to HIT |
| 551 | Compare the fetch address from L2O against the SC address ranges |

TABLE 2-continued

Processor Store L1 Cache Miss Flowchart Description

| NUMBER | Description |
|---|---|
| | to determine which SC can access the data |
| 552 | Compare the castout address from L20 against the SC address ranges |
| | to determine which SC can access the data |
| | Is the replaced modified line in the same SC as the line that is to be fetched? |
| 552A | Compare the castout address from L20 against the SC address ranges |
| | to determine which SC can access the data |
| | Is the replaced modified line in the same SC as the line that is to be fetched? |
| 554 | The replaced line is in the same SC. |
| | Load the L2 SC0 request queue with a Fetch Exclusive command. |
| 555 | The replaced line is in the same SC. |
| | Load the L2 SC1 request queue with a Fetch Exclusive command. |
| 556 | The replaced line is not in the same SC. |
| | Load the L2 SC0 request queue with a Fetch Exclusive command. |
| 557 | The replaced line is not in the same SC. |
| | Load the L2 SC1 request queue with a Fetch Exclusive command. |
| 558 | The replaced line is not in the same SC. |
| | Load the L2 SC1 request queue with a Replace command. |
| 559 | The replaced line is not in the same SC. |
| | Load the L2 SC0 request queue with a Replace command. |
| 560 | Is the bus between the L2 and SC available? |
| 562 | Load the SC L20 request queue. |
| 564 | Is the request in the SC L2 request queue a Fetch Exclusive and Castout command? |
| 566 | Request is a Fetch Exclusive and Castout command. |
| | Is the Modified Line Buffer full? |
| 568 | Is the SC "traffic cop" free? |
| 570 | Is the request a Fetch Exclusive command? |
| 572 | Is the request a Fetch Exclusive and Castout command? |
| 574 | The request is a Fetch Exclusive and Castout command. |
| | Use state of replaced line. |
| | Search L20 Copy Directory. |
| 576 | Is the state of the replaced line in a channel transition state? |
| 578 | Is the state of the replacement address LOP? |
| 580 | Is the state of the replacement address IOP? |
| 582 | Is the state of the replacement address HIT? |
| 584 | The state of the replacement address is HIT. |
| | Set the state of the requesting L2 Copy directory to MISS. |
| | Set the state of the Modified Line Buffer to CP (Castout in Progress). |
| 586 | The state of the replaced line is in a channel transition state. |
| | Hold the Fetch Exclusive and Castout command until the state of the replacement line |
| | is resolved. |
| 588 | Is the state of the replacement address resolved? |
| 599 | The state of the replacement address is either LOP or IOP). |
| | Set the state of the requesting L2 Copy directory to MISS. |
| 592 | Using the Fetch line address |
| | Search the L2 copy directories. |
| | Search the I/O locks. |
| | Search the Modified Line Buffer. |
| | Access the reconfiguration array. |
| 594 | Is the request an Invalidate Exclusive command? |
| 596 | Is the state of the Invalidate address in L20 MISS? |
| 598 | Is the state of the Invalidate address in L20 IOP? |
| 600 | Is the state of the Invalidate address in L20 CAP? |
| 602 | Is the state of the Invalidate address in L20 CSP? |
| 604 | The state of the Invalidate address is in transition |
| | toad the SC L2 response queue with a Retry Response. |
| | Set the requesting L2 Copy directory to HIT state. |
| 606 | The state of the Invalidate address is not in transition |
| | Is the state of the Invalidate address in Lb. HIT? |
| 608 | The state of the Invalidate address in 1.21 is not a HIT. |
| | Load the SC L2 response queue with a Successful Response. |
| 610 | Is the request a Fetch Exclusive command? |
| 612 | Is the line locked by the I/O? |
| 614 | The line is locked by the I/O. |
| | Load the SC L2 response queue with a Retry response |
| 616 | The Line is not locked by the I/O. |
| | Is the line in a transition state? |
| 618 | The line is in a transition state. |
| | Hold the request at the SC L2 request queue until the state of the line is resolved. |
| 620 | Is the state of the line resolved? |
| 622 | There is a copy of the line in the other L2. |
| | Is the other L2's SC request queue full? |
| 624 | The other L2's SC request queue is full. |
| | Hold the request at the SC L2 request queue until the other L2's SC request queue is |
| | available. |
| 626 | Is the other L2's SC request queue full? |

TABLE 2-continued

Processor Store L1 Cache Miss Flowchart Description

| NUMBER | Description |
|---|---|
| 628 | The other L2's SC request queue is available.<br>Load the other L2's SC request queue with the Invalidate Exclusive command.<br>Hold the requesting L2's response for the Other L2's response to the Invalidate Exclusive command.<br>Set the requesting L2's and the other L2's Copy directory state to IOP (Invalidate Operation). |
| 630 | Is the other L2's SC L2 bus available? |
| 632 | The other L2's SC L2 bus is available.<br>Load the other L2's SC request queue with the Invalidate Exclusive command. |
| 634 | Is the other L2's "traffic cop" available? |
| 636 | The other L2's "traffic cop" is available.<br>Search the L2 directory.<br>Search the LI Copy directories. |
| 638 | Is there a HIT state in the L2 directory? |
| 640 | There is a HIT state in the L2 directory.<br>Is the Copy Bit set? |
| 642 | The Copy Bit is set.<br>Set the L2 directory state to MISS. |
| 644 | Is the State of the line in the L1 Copy Directory a HIT? |
| 645 | The State of the Line in the L1 Copy Directory is a HIT?<br>Send Invalidate request to L1's which have a copy of the line. |
| 646 | Load the L2 SC response queue with a Successful response. |
| 648 | Is the other L2's SC L2 bus available? |
| 650 | The other L2's SC L2 bus is available.<br>Load the other L2's SC response queue. |
| 652 | Is the SC "traffic cop" available? |
| 654 | The SC "traffic cop" is available.<br>Search the L2 Copy directories. |
| 656 | Is the state of the Invalidate address in the Requesting L2's Copy Directory IOP? |
| 658 | There is not a HIT state in the L2 directory.<br>13 there an IE (Invalidate Exclusive) state with the Copy bit in the L2 directory? |
| 660 | There is an IE (Invalidate Exclusive) state with a Copy Bit set in the L2 directory?<br>Reset Copy Bit in L2 Directory. |
| 662 | There is not an IE (Invalidate Exclusive) state with the Copy bit in the L2 directory?<br>Is there a HIT state in the Replacement Buffer directory? |
| 664 | There is a HIT state in the Replacement Buffer directory.<br>Set Replacement Buffer Directory state to MISS. |
| 666 | The state of the Invalidate address is IOP?<br>Load the requesting L2's response queue with a Successful response<br>Set the requesting L2's Copy directory state to HIT.<br>Set the other L2's Copy directory state to MISS. |
| 668 | Is there a copy of the line in the other L2? |
| 670 | There is a copy of the line in the other L2.<br>Is the other L2's SC request queue full? |
| 672 | The other L2's SC request queue is full.<br>Hold the request at the SC L2 request queue until the other L2's SC request queue is available. |
| 674 | Is the other L2's SC request queue full? |
| 676 | The other L2's SC request queue is available.<br>Load the other L2's SC request queue with the Fetch Exclusive command.<br>Hold the requesting L2's response for the Other L2's response to the Fetch Exclusive command.<br>Set the requesting L2's directory state to LOP (L2 Operation in Progress).<br>Set the other L2's Copy directory state to IOP (invalidate Operation). |
| 678 | Is the other L2's SC L2 bus available? |
| 680 | The other L2's SC L2 bus is available.<br>Load the other L2's L2 SC request queue with the Fetch Exclusive command. |
| 682 | Is the other L2's "traffic cop" available? |
| 684 | The other L2's "traffic cop" is available.<br>Search the L2 directory.<br>Search the PULocks.<br>Search the Replacement Buffer directory.<br>Search the LI Copy directories. |
| 686 | The line is locked by a PU.<br>Load the L2 SC response queue with Retry response. |
| 688 | Is the line locked by a PU Lock? |
| 690 | There is not a copy of the tine in the other L2.<br>Is there a copy of the line in the Modified Line Buffer? |
| 692 | There is a copy of the line in the Modified Line Buffer.<br>Load the line from the Modified Line Buffer to the I 2 Interface Fetch Buffer.<br>Load the SC L2 response queue with a Modified Response.<br>Set the requesting L2 Copy directory to HIT state. |
| 694 | There is not a copy of the line in the Modified Line Buffer.<br>Load the Storage SC L2 request queue with Fetch command.<br>Load the SC L2 response queue with Not Modified response. |

TABLE 2-continued

Processor Store L1 Cache Miss Flowchart Description

| NUMBER | Description |
|---|---|
| | Hold the L2 response for the Storage response for the Fetch command. |
| | Set the requesting L2 Copy directory state to MOP (Memory Operation in Progress). |
| 696 | Is the SC Storage Bus available? |
| 698 | The SC Storage Bus is available. |
| | Load the Storage SC request queue with the Fetch command. |
| 700 | Is the Storage "traffic cop" available? |
| 702 | The Storage "traffic cop" is available. |
| | Access the memory to fetch the line. |
| 704 | Load the Storage Data Buffer with the data from the memory. |
| | Load the Storage SC response queue with Not Modified response. |
| 706 | Is the SC Storage bus available? |
| 708 | The SC Storage bus is available? |
| | Load the SC Storage response queue with the Storage response. |
| | Load the requesting L2 Data Buffer with the data. |
| 710 | Is the SC "traffic cop" available? |
| 712 | The SC "traffic cop" is available. |
| | Release the requesting L2 response in the L2 response queue. |
| | Set the requesting L2 Copy directory state to HIT. |
| 714 | The line is not locked by a PU Lock. |
| | Is there a HIT state in the L2 directory? |
| 716 | There is a HIT state in the L2 directory. |
| | Is the line modified? |
| 718 | The line has been modified. |
| | Load the L2 SC response queue with a Modified response. |
| | Set the L2 and Replacement Buffer directories state to MISS. |
| 720 | Are any L1 Copy directories states set to HIT. |
| 722 | Invalidate all LI copies and set LI Copy directories state to MISS. |
| 724 | Is the other L2's SC L2 bus available? |
| 726 | The other L2's SC L2 bus is available. |
| | Load the other L2's SC response queue. |
| | Load the requesting L2's Data Buffer with the data associated with the response. |
| 728 | Is the SC "traffic cop" available? |
| 730 | The SC "traffic cop" is available. |
| | Search the L2 Copy directories. |
| 732 | Is the response from an Invalidate Exclusive request? |
| 734 | The response is from an Invalidate Exclusive request. |
| | Load the requesting L2's response queue with a Successful response. |
| | Set the requesting L2's Copy directory state to HIT. |
| | Set the other L2's Copy directory state to MISS. |
| 736 | The line has not been modified. |
| | Load the L2 SC response queue with a Not Modified response. |
| | Set the L2 and Replacement Buffer directories state to MISS. |
| 738 | Is the response from a Fetch Exclusive request? |
| 740 | Is the Fetch Exclusive response Not Modified? |
| 742 | The response is a Not Modified response. |
| | Load the requesting L2's response queue with a Not Modified response. |
| | Set the requesting L2's Copy directory state to HIT. |
| | Set the other L2's Copy directory state to MISS. |
| 744 | Is the response a Modified response? |
| 746 | The response is a Modified response. |
| | Load the requesting L2's response queue with a Modified response. |
| | Set the requesting L2's Copy directory state to L1 IT. |
| | Set the other L2's Copy directory state to MISS. |
| | Set the Modified Line Buffer's directory state to MISS |
| 748 | Is the response a Retry response? |
| 750 | The response is a Retry response. |
| | Load the requesting L2's response queue with a Retry response. |
| | Set the requesting L2's Copy directory state to MISS. |
| | Set the other L2's Copy directory state to HIT. |
| 752 | There is not a HIT state in the L2 directory. |
| | Is there an IE (Invalidate Exclusive) state with the Copy bit in the L2 directory? |
| 754 | There is an IE (Invalidate Exclusive) state with the Copy bit in the L2 directory. |
| | Load the L2 SC response queue with a Not Modified response. |
| | Reset Copy Bit in L2 Directory. |
| 756 | There is not an IE (Invalidate Exclusive) state |
| | with the Copy bit in the L2 directory? |
| | Is there a HIT state in the Replacement Buffer directory? |
| 758 | The tine is modified in the Replacement Buffer. |
| | Load the L2 SC response queue with Modified response. |
| | Set Replacement Buffer Directory state to MISS. |
| 760 | There is a HIT state in the Replacement Buffer directory. |
| | Is the line modified? |
| 762 | The line is not modified in the Replacement Buffer. |
| | Load the L2 SC response queue with Not Modified response. |
| | Set Replacement Buffer Directory state to MISS. |

TABLE 2-continued

Processor Store L1 Cache Miss Flowchart Description

| NUMBER | Description |
|---|---|
| 764 | Is the SC L2 bus available? |
| 766 | The SC L2 bus is available.<br>Load the L2 SC response queue with the SC response.<br>If data is associated with response, load the requesting LI<br>Fetch Buffer with the data, |
| 768 | Is the L2 "traffic cop" available? |
| 770 | The L2 "traffic cop" is available.<br>Search L2 Directory<br>Search PU Locks |
| 772 | Is the Response frown an Invalidate Exclusive request? |
| 774 | The Response is from an Invalidate Exclusive request?<br>Is the response a Retry Response? |
| 776 | Is the Line Locked by a PU? |
| 778 | Set L2 Directory state to HIT.<br>Reset Copy bit.<br>Set Modified bit.<br>Set Locally modified bit.<br>Store data from L1 Store Q into L2 Cache.<br>Send Store Complete to requesting PU. |
| 780 | Set L2 Directory state to MISS. |
| 782 | Set L2 Directory state to HIT.<br>Reset Copy bit.<br>Send Locked Response to requesting PU. |
| 784 | Is the Response from a Fetch Exclusive request? |
| 786 | The Response is from a Fetch Exclusive request?<br>Is the response a Retry Response? |
| 788 | The Response is from a Fetch Exclusive request?<br>Is the response a Not Modified Response? |
| 790 | Is the Line Locked by a PU? |
| 792 | Set L2 Directory state to HIT.<br>Reset Copy bit.<br>Reset Modified bit.<br>Reset Locally modified bit.<br>Complete Inpage to L2 Cache from L1 Fetch Queue.<br>Send Locked Response to requesting PU. |
| 794 | Set L2 Directory state to HIT.<br>Reset Copy bit.<br>Set Modified bit.<br>Set Locally modified bit.<br>Store data from L1 Store Q into L1 Cache.<br>Send Store Complete to requesting PU.<br>Complete Inpage to L2 Cache from L1 Fetch Queue. |
| 796 | The Response is from a Fetch Exclusive request?<br>Is the response a Modified Response? |
| 798 | Is the Line Locked by a PU? |
| 800 | Set L2 Directory state to HIT.<br>Reset Copy bit.<br>Set Modified bit.<br>Reset Locally modified bit.<br>Complete Inpage to L2 Cache from L1 Fetch Queue.<br>Send Locked Response to requesting PU. |
| 794 | Set L2 Directory state tb HIT.<br>Reset Copy bit.<br>Set Modified bit.<br>Set Locally modified bit.<br>Store data from LI Store Q into L2 Cache.<br>Send Store Complete to requesting PU.<br>Complete Inpage to L2 Cache from L1 Fetch Queue. |

Figure 5B:
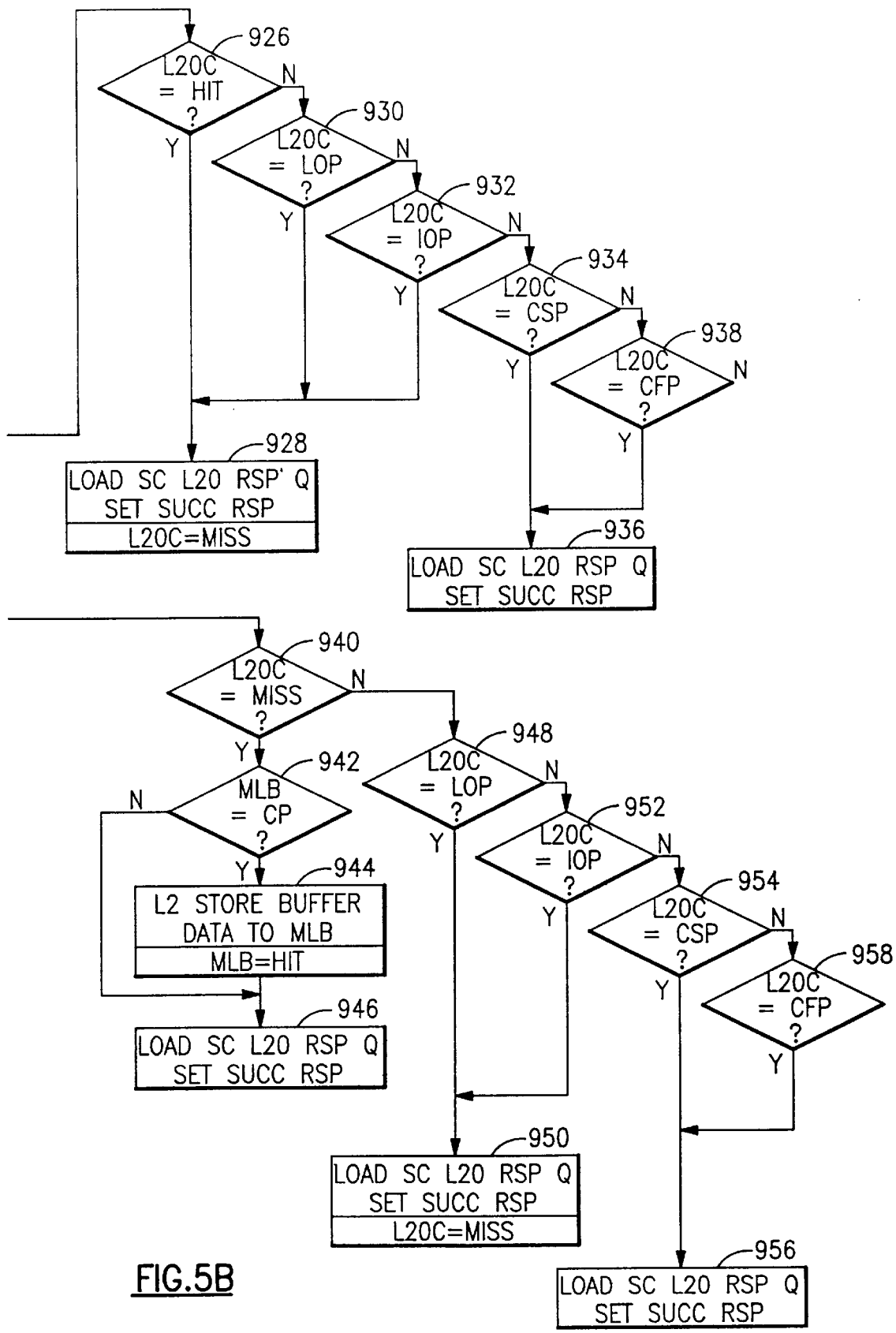
FIGS. 5, comprises of FIGS. 5A and 5B, is a flow chart which illustrates castout operations of the hardware within the two level cache system of FIG. 2.

FIG. 5 is a flow chart describing use of the hardware of FIG. 2 in a castout operation. The following table 3 defines each of the steps of FIG. 5.

TABLE 3

L2 Castout/Replacement Flowchart Description

| NUMBER | Description |
|---|---|
| 900 | L2 Castout or L2 Replace request. |
| 902 | Is the SC L2 bus available? |

TABLE 3-continued

L2 Castout/Replacement Flowchart Description

| NUMBER | Description |
|---|---|
| 904 | The SC L2 bus is available.<br>Load the SC L2 request queue with the L2 Castout or<br>Replace command. |
| 906 | Is the L2 request an L2 Castout command? |
| 908 | The L2 request is an L2 Castout command.<br>Wait for the SC L2 Store Buffer to be loaded. |

TABLE 3-continued

L2 Castout/Replacement Flowchart Description

| NUMBER | Description |
|---|---|
| 910 | Is the SC "traffic cop" available? |
| 912 | The SC "traffic cop" is available. |
|  | Search requesting L2's Copy directory. |
|  | Search the Modified Line Buffer's directory. |
|  | Access the Reconfiguration array for the physical address. |
| 914 | Is the SC request an L2 Replace command? |
| 916 | The SC request is not an L2 Replace command. |
|  | Is the SC Request an L2 Castout command? |
| 918 | The SC request is an L2 Castout command. |
|  | Is the requesting L2's Copy directory state HIT? |
| 920 | The requesting L2's Copy directory state is HIT. |
|  | Is the Modified Line Buffer full? |
| 922 | The Modified Line Buffer is not full. |
|  | Load the Modified Line Buffer with the data in the L2 Store Buffer. |
|  | Load the requesting L2's response queue with Success response. |
|  | Set the requesting L2's Copy directory state to MISS. |
|  | Set the Modified Line Buffer, whose previous state is HIT, to MISS. |
|  | Set the Modified Line Buffer state for the new line to HIT. |
| 924 | The Modified Line Buffer's is full. |
|  | Hold the request at the SC L2 request queue until the Modified Line Buffer is not full. |
| 926 | Is the requesting L2's Copy directory state HIT? |
| 928 | The requesting L2's Copy directory state is either HIT, LOP, or IOP. |
|  | Load the requesting L2's response queue with a Success response. |
|  | Set the requesting L2's Copy directory state to MISS. |
| 930 | Is the requesting L2's Copy directory state LOP (L2 Operation in Progress)? |
| 932 | Is the requesting L2's Copy directory state IOP (Invalidate Operation in Progress)? |
| 934 | Is the requesting L2's Copy directory state CSP (Channel Store in Progress)? |
| 936 | The requesting L2's Copy directory state is either CSP or CFP. |
|  | Load the requesting L2's response queue with a Success response. |
| 938 | Is the requesting L2's Copy directory state CFP (Channel Fetch in Progress)? |
| 940 | Is the requesting L2's Copy directory state MISS. |
| 942 | The requesting L2's Copy directory state is MISS. |
|  | Is the Modified Line Buffer's directory state CP (Castout in Progress)? |
| 944 | The Modified Line Buffer's state is CP (Castout in Progress). |
|  | Load the Modified Line Buffer with the data in the L2 Store Buffer. |
|  | Set the Modified Line Buffer state to HIT. |
| 946 | Load the requesting L2's response queue with a success response. |
| 948 | Is the requesting L2's Copy directory state LOP (L2 Operation in Progress)? |
| 950 | The requesting L2's Copy directory state is either LOP, or IOP. |
|  | Load the requesting L2's response queue with a Success response. |
|  | Set the requesting L2's Copy directory state to MISS. |
| 952 | Is the requesting L2's Copy directory state IOP (Invalidate Operation in Progress)? |
| 954 | Is the requesting L2's Copy directory state CSP (Channel Store in Progress)? |
| 956 | The requesting L2's Copy directory state is either CSP or CFP. |
|  | Load the requesting L2's reaponse queue with a Success response. |
|  | Is the requesting L2's Copy directory state CFP (Channel Fetch in Progress)? |

We claim:

1. A hierarchical cache system comprising:

first and second pluralities of data caches;

first higher level cache means, coupled to said first plurality of caches, for storing data stored in said first plurality of caches;

second higher level cache means, coupled to said second plurality of caches, for storing data stored in said second plurality of caches;

first and second controller means for accessing first and second respective address ranges from said main memory and including directory means for accessing a particular one of said first and second higher level cache means in accordance with storage of requested data therein; and wherein said first higher level cache means including means for responding to a request for data not contained in said first higher level cache means by determining which of said first and second respective address ranges encompasses the requested data and forwarding said request to a storage controller means which can access the determined address range; and said second higher level cache means includes means for responding to a request for data not contained in said second higher level cache means by determining which of said first and second respective address ranges encompasses the requested data and forwarding said request to a storage controller means which can access the determined address range.

2. A cache system as set forth in claim 1 wherein said means for accessing included in said first storage controller means includes first and second directories of addresses in said first address range which are represented in said first and second higher level cache means, respectively, and said means for accessing included in said second storage controller means includes third and fourth directories of addresses in said second address range which are represented in said first and second higher level cache means, respectively.

3. A cache system as set forth in claim 2 wherein said first storage controller responds to a request for data from said first higher level cache subsystem by checking the address of the data in said second directory, and passing the request to said second higher level cache subsystem if the requested data is stored there and otherwise passing the request to said first range of main memory.

4. A cache system as set forth in claim 3 wherein said first storage controller responds to a request for data from said second higher level cache subsystem by checking the address of the data in said first directory, and passing the request to said first higher level cache subsystem if the requested data is stored there and otherwise passing the request to said first range of main memory.

5. A cache system as set forth in claim 4 wherein said second storage controller responds to a request for data from said first higher level cache subsystem by checking the address of the data in said fourth directory, and passing the request to said second higher level cache subsystem if the requested data is stored there and otherwise passing the request to said second range of main memory.

6. A cache system as set forth in claim 5 wherein said second storage controller responds to a request for data from said second higher level cache subsystem by checking the address of the data in said third directory, and passing the request to said first higher level cache subsystem if the requested data is stored there and otherwise passing the request to said second range of main memory.

7. A cache system as set forth in claim 1 wherein:

said first higher level cache means includes for each address represented in said first higher level cache means an indication whether said second higher level cache means also includes said address.

8. A cache system as set forth in claim 7 wherein:

said second higher level cache means includes for each address represented in said second higher level cache means an indication whether said first higher level cache means also includes said address.

9. A cache system as set forth in claim 4 further comprising:

means, responsive to a request to update data in said first plurality of caches, for storing the updates into said first higher level cache but not into said second higher level cache, and means, responsive to a request to update data in said second plurality of caches, for storing the updates into said second higher level cache but not into said first higher level cache.

10. A cache system as set forth in claim 1 further comprising:

a first plurality of data buses interconnecting said first plurality of caches, respectively, to said first higher level cache means to form a first cache cluster, and a second plurality of data buses interconnecting said second plurality of caches, respectively, to said second higher level cache means to form a second cache cluster, whereby there is no cache data path between said first plurality of caches and said second higher level cache means except via said first higher level cache, and there is no cache data path between said second plurality of caches and said first higher level cache except via said second higher level cache means.

11. A method for operating a hierarchical cache system including first and second pluralities of data caches;

first higher level cache means, coupled to said first plurality of caches, for storing data stored in said first plurality of caches;

second higher level cache means, coupled to said second plurality of caches, for storing data stored in said second plurality of caches; and first and second controller means for accessing first and second respective address ranges from said main memory and accessing said first and second higher level cache means; said method comprising the steps of:

responding to a request for data not contained in said first higher level cache means by determining, at said first controller means, which of said first and second respective address ranges encompasses the requested data and forwarding said request to a storage controller means which can access the determined address range; and responding to a request for data not contained in said second higher level cache means by determining, at said second controller means, which of said first and second respective address ranges encompasses the requested data and forwarding said request to a storage controller means which can access the determined address range and accessing data from a respective range of main memory or one of said first and second higher level cache means.

12. A method as set forth in claim 11 wherein said step of responding to a request for data includes accessing, at said first controller means, first and second directories of addresses in said first address range which are represented in said first and second higher level cache means, respectively, and said step of responding to a request for data includes accessing, at said second controller means, third and fourth of addresses in said second address range which are represented in said first and second higher level cache means, respectively.

13. A method as set forth in claim 12 wherein said first storage controller responds to a request for data from said first higher level cache subsystem by checking the address of the data in said second directory, and passing the request to said second higher level cache subsystem if the requested data is stored there and otherwise passing the request to said first range of main memory.

14. A method as set forth in claim 13 wherein said first storage controller responds to a request for data from said second higher level cache subsystem by checking the address of the data in said first directory, and passing the request to said first higher level cache subsystem if the requested data is stored there and otherwise passing the request to said first range of main memory.

15. A method as set forth in claim 14 wherein said second storage controller responds to a request for data from said first higher level cache subsystem by checking the address of the data in said fourth directory, and passing the request to said second higher level cache subsystem if the requested data is stored there and otherwise passing the request to said second range of main memory.

16. A method as set forth in claim 15 wherein said second storage controller responds to a request for data from said second higher level cache subsystem by checking the address of the data in said third directory, and passing the request to said first higher level cache subsystem if the requested data is stored there and otherwise passing the request to said second range of main memory.

17. A method as set forth in claim 11 wherein said first higher level cache means includes for each address represented in said first higher level cache means an indication whether said second higher level cache means also includes said address.

18. A method as set forth in claim 17 wherein said second higher level cache means includes for each address represented in said second higher level cache means an indication whether said first higher level cache means also includes said address.

19. A method as set forth in claim 14 further comprising the steps of:

storing the updates into said first higher level cache but not into said second higher level cache, responsive to a request to update data in said first plurality of caches; and storing the updates into said second higher level cache but not into said first higher level cache responsive to a request to update data in said second plurality of caches.

20. A method as set forth in claim 11 further comprising the steps of:

forming an exclusive cache data path between said first plurality of caches and said-second higher level cache means; and forming an exclusive cache data path between said second plurality of caches and said first higher level cache.

* * * * *